US008566016B2

(12) United States Patent
Law et al.

(10) Patent No.: US 8,566,016 B2
(45) Date of Patent: Oct. 22, 2013

(54) SURFACE HOLD ADVISOR USING CRITICAL SECTIONS

(75) Inventors: Caleb Hoi Kei Law, Palo Alto, CA (US); Thomas Kun-Lung Hsiao, Cupertino, CA (US); Nathan C. Mittler, Santa Clara, CA (US); George J. Couluris, Menlo Park, CA (US)

(73) Assignee: Saab Sensis Corporation, Wilmington, DE (US)

( * ) Notice: Subject to any disclaimer, the term of this patent is extended or adjusted under 35 U.S.C. 154(b) by 466 days.

(21) Appl. No.: 12/966,293

(22) Filed: Dec. 13, 2010

(65) Prior Publication Data

US 2011/0282565 A1 Nov. 17, 2011

Related U.S. Application Data

(60) Provisional application No. 61/334,288, filed on May 13, 2010.

(51) Int. Cl.

| | |
|---|---|
| ***G06F 17/10*** | (2006.01) |
| ***G06G 7/78*** | (2006.01) |
| ***G08G 1/16*** | (2006.01) |

(52) U.S. Cl.

USPC ........ 701/301; 701/1; 701/3; 701/9; 701/300; 701/302; 701/519

(58) Field of Classification Search

USPC .................. 701/1, 3–18, 116–122, 400–541, 701/301–302; 340/901–905, 906, 909–924, 340/931, 932, 933–943, 945–983, 988–996

See application file for complete search history.

(56) References Cited

U.S. PATENT DOCUMENTS

| | | | |
|---|---|---|---|
| 3,976,272 | A | 8/1976 | Murray et al. |
| 4,122,523 | A | 10/1978 | Morse et al. |
| 5,623,413 | A | 4/1997 | Matheson et al. |

OTHER PUBLICATIONS

Balakrishnan, H., Jung, Y. "*A Framework for Coordinated Surface Operations Planning at Dallas-Fort Worth International Airport*," AIAA 2007-6553, Guidance Navigation and Control (GNC) Conference, Hilton Head, SC (Aug. 20-23, 2007).

Brinton, C., "*Improved Taxi Prediction Algorithms for the Surface Management System*," AIAA 2002-4857, Guidance Navigation and Control (GNC) Conference, Monterey, CA (Aug. 5-8, 2002).

Cheng, V.H.L., Foyle, D.C., "*Automation Tools for Enhancing Ground-Operation Situation Awareness and Flow Efficiency*," AIAA 2002_4856, Guidance Navigation and Control (GNC) Conference, Monterey, CA (Aug. 5-8, 2002).

(Continued)

*Primary Examiner* — Bhavesh V Amin

(74) *Attorney, Agent, or Firm* — Burr & Brown

(57) ABSTRACT

The Surface Hold Advisor Using Critical Sections is a system and method for providing hold advisories to surface controllers to prevent gridlock and resolve crossing and merging conflicts among vehicles traversing a vertex-edge graph representing a surface traffic network on an airport surface. The Advisor performs pair-wise comparisons of current position and projected path of each vehicle with other surface vehicles to detect conflicts, determine critical sections, and provide hold advisories to traffic controllers recommending vehicles stop at entry points to protected zones around identified critical sections. A critical section defines a segment of the vertex-edge graph where vehicles are in crossing or merging or opposite direction gridlock contention. The Advisor detects critical sections without reference to scheduled, projected or required times along assigned vehicle paths, and generates hold advisories to prevent conflicts without requiring network path direction-of-movement rules and without requiring rerouting, rescheduling or other network optimization solutions.

36 Claims, 24 Drawing Sheets

(56) References Cited

OTHER PUBLICATIONS

Couluris, G.J., Davis, P.C., Mittler, N.C, Saraf, A.P., Timar, S.D, "*ACES Terminal Model Enhancement*," DASC 2009-130, AIAA 28th Digital Avionics Systems Conference, Orlando, FL, (Oct. 27, 2009).

Couluris, G., Mittler, N., Stassart, A., Signor, D., and Hsiao, T., "*A New Modeling Capability for Airport Surface Traffic Analysis*," Paper 3E4, Digital Avionics System Conference (DASC), St. Paul, MN (Oct. 26-28, 2008).

Garcia, J., Berlanga, A., Molina, J.M., Beseda, J.A., Casar, J.R., "*Planning Techniques for Airport Ground Operations*," Paper 1d5, Digital Avionics System Conference (DASC), Irvine, CA (Oct. 27-31, 2002).

Hatzack W., B. Nebel, 2001. "*The Operational Traffic Control Problem: Computational Complexity and Solutions*," A. Cesta (Ed.), Proceedings of the Sixth European Conference on Planning (ECP'01), (2001).

Keith, G., Richards, A., "*Optimization of Taxiway Routing and Runway Scheduling*," AIAA-2008-6827-760, Guidance Navigation and Control (GNC) Conference, Honolulu, HI (Aug. 18-21, 2008).

Nguyen, A.T., Baras, J.S., "*Network Cell Routing Model for Control of Throughput and Delay of Air Traffic*," Paper 2b2, Digital Avionics System Conference (DASC), Orlando, FL (Oct. 25-29, 2009).

Rathinam, S., Montoya, J., Jung, Y., "*An Optimization Model for Reducing Aircraft Taxi Times at the Dallas Fort Worth International Airport*," ICAS 2008-570, 26th International Congress of the Aeronautical Sciences, Anchorage, AK (Sep. 14-19, 2008).

Wood, Z., Rathinam, S., "A Simulator for Modeling Aircraft Surface Operations at Airports," AIAA 2009_5912, Modeling and Simulation (MST) Conference, Chicago, IL (Aug. 10-13, 2009).

SURFACE HOLD ADVISOR USING CRITICAL SECTIONS

U.S. GOVERNMENT RIGHTS

The present invention was made with United States Government support under contract NNA08BA44D awarded by the National Aeronautics and Space Administration (NASA). The United States Government has certain rights in the invention.

FIELD OF THE INVENTION

This invention relates to methods for preventing gridlock and preventing merging and crossing conflicts between vehicles on an airport surface.

BACKGROUND OF THE INVENTION

Current airport surface air traffic controllers generally assign surface route paths to aircraft and other vehicles that conform to prescribed routings. Current controllers monitor aircraft positions and movements by observation and by viewing electronic displays where available, and mentally determine surface path assignments based on the predefined routing guidelines for vehicles traversing the airport movement area, normally between runways and ramp entry/exit points. These prescribed routings define direction-of-movement rules along various series of taxiway segments. These routings segregate inbound and outbound surface traffic flows to minimize to the extent possible interference between the flows. However various points of crossing and merging within and between flows are unavoidable, leading to potential crossing and merging conflicts that must be resolved by traffic controllers. Airline ramp traffic controllers assign routings for movement in ramp areas between the airport movement area exit/entry points and terminal gates.

Air traffic controllers issue taxi clearances that typically identify the path to be traversed and a clearance limit in the form of a hold instruction. The hold instruction defines a point along the path towards which the vehicle may move under pilot/operator autonomous control (i.e., pilot discretion) but at which the vehicle must stop unless otherwise directed by the controller. The pilot/operator maintains self-separation with other vehicles to preclude overtaking along the assigned path. In the current system, by defining hold points at crossing or merge intersections on the surface taxiway network of the airport, the traffic controller manages potential conflicts without extensive automation decision-making support. The controller resolves individual potential conflicts as vehicles approach intersections by selecting one of the vehicles for traversal of the intersection and issuing or maintaining holds on the other approaching aircraft.

The use of prescribed routes on the airport surface facilitates surface traffic management, but introduces inherent delay by circumventing more-direct routings between various start and end points for multiple aircraft. Also, the current process of separately resolving individual potential conflicts does not consider network-wide effects, and leads to solutions that are not the best solutions with respect to overall system delays. A more serious concern is the possibility of air traffic controller issued taxi clearances creating surface gridlock. Gridlock is a situation where vehicles are not able to move forward because of oncoming traffic (e.g., two aircraft nose-to-nose on a taxiway segment, four aircraft entering a four-way intersection, a gate or ramp exit blocked by an inbound aircraft, and the like). While current surface traffic controllers readily resolve conflicts among vehicles approaching crossing and merging intersections, the surface traffic controllers can not assure the gridlock-free movement of vehicles on the airport surface on downstream segments. Further, the potential for gridlock is increased during route transition periods where paths are dynamically modified and often partially reversed due to runway configuration changes, which directly impact surface traffic management on the airport surface. Gridlock potential is most problematic at large airports during busy transition periods where numerous alternative routings available to controllers can lead to incompatible path assignments.

Prior art documents that generally address gridlock and vehicle path conflicts are related to various automated systems for railroad network train control. These prior art references apply fixed or moving block control strategies in which the track sections preceding a train are examined for conflicts and trains are prevented from entering a blocked section (i.e., a section occupied by or assigned to a predecessor) using signalization systems. These prior art references allow forward or reverse movement of trains, and allow the use of track sidings as secondary routings to enable one train to pass another on a single track (assigned route). These prior art references include:

- U.S. Pat. No. 3,976,272 resolves blockages in part by selecting conflict-free alternative routes if currently available or soon available.
- U.S. Pat. No. 4,122,523 in addition enables time window scheduling to resolve conflicts in blocked segments, and further applies a cost-based optimization strategy to minimize system delay.
- U.S. Pat. No. 5,623,413 extends these solutions by providing a framework for applying alternative multi-path optimization techniques (e.g., simulated annealing, branch and bound search algorithms) to define schedules that resolve railroad network blockages.

These prior art references require the availability of routing options or the application of scheduling techniques or both. The capabilities disclosed in these prior art references are not required by the methodology of the present invention herein to resolve conflicts in the airport surface traffic network.

Other related prior art references describe route selection, rescheduling or other network optimization applications. These capabilities are not required by the present invention to generate hold advisories. Some of the other prior art references disclose various means for defining path assignment inputs, these include:

- Balakrishnan et al. applies an integer programming formulation for optimizing taxiway operations at an airport, focusing on controlled gate push-backs and taxi reroutes.
- Brinton et al. identifies computational solution formulations (e.g., Dijkstra, A* algorithms) that support an automated Surface Movement Management System in determining airport optimal surface routings for arrival and departure aircraft.
- Cheng et al. describes the automated Ground-Operation Situation Awareness and Flow Efficiency system to predict aircraft crossing times at selected locations and manipulate airport surface taxi routes and schedules to reduce delays.
- García et al. examines the capabilities of a modified minimum-cost maximum flow algorithm and a genetic algorithm to assist air traffic controllers in scheduling and selecting taxi routes to maximize ground airport capacity.

Hatzack et al. designs algorithms to apply job-shop scheduling solutions in the presence of blocking constraints to schedule airport surface traffic movement.

Keith et al. develops a single mixed integer linear programming method to optimize airport taxi routing and runway scheduling.

Nguyen et al. propose an approach to balance optimization objectives to maximize aircraft traffic flow and minimize delay in a generalized air traffic network using a multi-commodity traffic flow integer program.

Rathinam et al. formulates a mixed integer linear program solution for scheduling airport surface taxi movement that accounts for aircraft type and aircraft separation rules.

Wood et al. focuses on the application of scheduling algorithms to integrate airport surface taxiway and runway operations, and demonstrates the application of a dynamic programming departure scheduler with first-come first-serve taxiway heuristics to manage delay.

Several prior art references also emulate current airport surface traffic control operations which enforce predefined network path direction-of-movement rules to minimize gridlock and manage vehicle crossings of individual vertexes along these predefined paths. For example, Couluris, Mittler et al. describes a method to control aircraft movement through an airport surface link-node network by individually scheduling each aircraft's traversal of a node to resolve conflicts when the aircraft requests entry to that node or a link leading to and connected the that node. Couluris et al. applies predefined network paths to separate inbound and outbound traffic flows.

What is needed is a method for preventing gridlock and resolving potential crossing and merging conflicts among the vehicles on an airport surface area before the conflicts occur that considers simultaneously a multitude of nodes/vertexes that have potentially a multitude of contending vehicles where each vehicle is assigned a path through the surface network.

SUMMARY OF THE INVENTION

According to a first aspect of the present invention, there is provided a method for preventing conflicts between vehicles in a vehicle traffic network on an airport surface, the method comprising defining the traffic network on an airport surface, the traffic network comprising at least a plurality of taxiways, runways and intersections therebetween, determining a location and an assigned path for each vehicle in the traffic network for which location and path data are provided, searching along the assigned path and identifying a conflict where assigned paths for two vehicles merge, cross or intersect from opposing directions on the airport surface, designating a critical section on the airport surface for each identified conflict and defining a protected zone for each identified critical section and determining a hold requirement for each identified conflict, the hold requirement defining a projected hold position for stopping one of the two vehicles in a conflicting pair at an entry point to the protected zone for the identified critical section. The method further comprising determining whether any of the projected hold positions for the vehicles intrudes into the protected zone, repositioning projected hold positions intruding into the protected zone, and providing a hold advisory to a traffic controller, the hold advisory comprising the hold requirement to stop all but one vehicle or all vehicles at entry points to the protected zone for each identified critical section on the airport surface.

In some embodiments, identifying the conflict comprises pairing one vehicle with each of the other vehicles in the traffic network, comparing the assigned path for the one vehicle to the assigned path for the other vehicle in the pair to identify common vertexes, identifying each common vertex as a part of a critical section on the airport surface, repeating the pairing and comparing of the assigned path for the one vehicle to the assigned paths for each of the remaining other vehicles in the traffic network, and repeating the pairing and comparing of the assigned paths for each of the remaining other vehicles in pairs in the traffic network.

In some embodiments, searching along the assigned path commences at a vertex most recently crossed by each vehicle in the pair and moves forward along a remaining portion of the assigned path for each vehicle, wherein the remaining portion includes a current position of the vehicle. In some embodiments, the vertex most recently crossed, the current position and remaining portion of the assigned path for each vehicle are provided as input data.

In some embodiments of the method of the present invention, the critical section is a crossing critical section when the assigned paths for each of the vehicles in the pair intersect a single vertex. In these embodiments, the protected zone of the crossing critical section comprises an area containing at least the identified single common vertex.

In some embodiments of the method of the present invention, the critical section is a merging critical section when the assigned paths for each of the vehicles in the pair have more than one common vertex and are moving in the same direction. In these embodiments, the protected zone of the merging critical section comprises an area containing at least a first common vertex identified along the assigned paths for each of the vehicles.

In some embodiments of the method of the present invention, the critical section is a gridlock critical section where the assigned paths for each of the vehicles in the pair have more than one common vertex and are moving in different directions. In these embodiments, protected zone of the gridlock critical section comprises an area containing a first common vertex along the assigned path and direction of travel for the one vehicle, an area containing a first common vertex along the assigned path and direction of travel for the another vehicle and an area containing the more than one common vertexes identified and the edges between each of the more than one common vertexes. In some embodiments, the protected zone is blocked when any part of a vehicle occupies any part of the protected zone.

In some embodiments, the method further comprises repositioning the projected hold position when a projected hold position causes the held vehicle to block at least a portion of a protected zone, wherein the repositioned projected hold position is an entry point for the vehicle to the protected zone. In other embodiments, repositioning the projected hold position comprises repositioning a hold position generated by an external function. In some embodiments, repositioning the projected hold position further comprises determining whether the repositioned hold position causes the held vehicle to block at least a portion of a protected zone and repositioning the repositioned hold position when the repositioned hold position causes the held vehicle to block at least a portion of a protected zone.

In some embodiments, the method further comprises applying user-defined prioritization rules to assign projected hold positions to vehicles when more than one vehicle is not assigned a projected hold position. In other embodiments, the hold advisories stop vehicles at an earliest hold position along the vehicle's path from the current position of the vehicle. In most embodiments, the hold requirement permits no more than one vehicle to move uninterrupted through the identified critical section.

In most embodiments, the hold position selected for each of the vehicles is provided to traffic controllers in surface air traffic control systems. In some of these embodiments, the airport surface traffic network is a graph, each of the plurality of intersections is a vertex on the graph and each of the runways and taxiways is an edge on the graph.

According to a second aspect of the present invention, there is provided a system for preventing conflicts between vehicles in a vehicle traffic network on an airport surface comprising one or more surveillance systems covering a traffic network on an airport surface, the traffic network comprising at least a plurality of taxiways, runways and intersections therebetween, and a computer running a program for preventing conflicts, wherein the computer receives at least location data and path data from the one or more surveillance systems, determines a location and an assigned path for each vehicle in the traffic network for which location and path data are provided, searches along the assigned path and identifies a conflict where assigned paths for two vehicles merge, cross or intersect from opposing directions on the airport surface, and designates a critical section on the airport surface for each identified conflict and defines a protected zone for each identified critical section. The computer further determines a hold requirement for each identified conflict, the hold requirement defines a projected hold position for stopping one of the two vehicles in a conflicting pair at an entry point to the protected zone for the identified critical section, determines whether any of the projected hold positions for the vehicles intrudes into the protected zone, repositions projected hold positions that intrude into the protected zone, and provides a hold advisory to a traffic controller. The hold advisory comprises a hold requirement to stop all but one vehicle or all vehicles at entry points to the protected zone for each identified critical section on the airport surface.

In some embodiments, the computer identifies a conflict by pairing one vehicle with each of the other vehicles in the traffic network; comparing the assigned path for the one vehicle to the assigned path for the other vehicle in the pair to identify common vertexes; identifying each common vertex as a part of a critical section on the airport surface, repeating the pairing and comparing of the assigned path for the one vehicle to the assigned paths for each of the remaining other vehicles in the traffic network, and repeating the pairing and comparing of the assigned paths for each of the remaining other vehicles in pairs in the traffic network.

In some embodiments, the computer searches along the assigned path starting at a vertex most recently crossed by each vehicle in the pair and moves forward along a remaining portion of the assigned path for each vehicle, the remaining portion of the assigned path including a current position of the vehicle. In other embodiments, the vertex most recently crossed, the current position and remaining portion of the assigned path for each vehicle are provided as input data to the computer by at least the one or more surveillance systems.

In some embodiments, the computer identifies the critical section as a crossing critical section when the assigned paths for each of the vehicles in the pair intersect a single vertex. In these embodiments, the computer determines the protected zone of the crossing critical section comprises an area containing at least the identified single common vertex.

In some embodiments, the computer identifies the critical section as a merging critical section when the assigned paths for each of the vehicles in the pair have more than one common vertex and are moving in the same direction. In these embodiments, the computer determines the protected zone of the merging critical section comprises an area containing at least a first common vertex identified along the assigned paths for each of the vehicles.

In some embodiments, the computer identifies the critical section as a gridlock critical section where the assigned paths for each of the vehicles in the pair have more than one common vertex and are moving in different directions. In these embodiments, the computer determines the protected zone of the gridlock critical section comprises an area containing a first common vertex along the assigned path and direction of travel for the one vehicle, an area containing a first common vertex along the assigned path and direction of travel for the another vehicle and an area containing the more than one common vertexes identified and the edges between each of the more than one common vertexes.

In some embodiments, the computer determines that the protected zone is blocked when any part of a vehicle occupies any part of the protected zone. In these embodiments, the computer repositions the projected hold position when a projected hold position causes the held vehicle to block at least a portion of a protected zone, wherein the repositioned projected hold position is an entry point for the vehicle to the protected zone. In other embodiments, the computer repositioning the projected hold position comprises repositioning a hold position generated by an external function.

In some embodiments, the computer applies user-defined prioritization rules to assign projected hold positions to vehicles when more than one vehicle is not assigned a projected hold position. In other embodiments, the computer determines whether the repositioned hold position causes the held vehicle to block at least a portion of a protected zone and repositions the repositioned hold position when the repositioned hold position causes the held vehicle to block at least a portion of a protected zone.

In some embodiments, the computer determines a hold position and displays the hold position selected for each of the one or more vehicles to traffic controllers in a surface traffic control system. In other embodiments, the hold advisories stop the one or more vehicles at an earliest hold position along the vehicle's path from the current position of the vehicle.

In some embodiments, the computer defines the airport surface traffic network on a graph with each of the plurality of intersections as a vertex on the graph and each of the runways and taxiways as an edge on the graph. In these embodiments, the hold requirement permits no more than one vehicle to move uninterrupted through the identified critical section.

BRIEF DESCRIPTION OF THE DRAWINGS

For a fuller understanding of the nature and objects of the invention, reference should be made to the following detailed description for practicing the invention, read in connection with the accompanying drawings in which:

FIG. 15(*b*) shows an example of the present invention resolving the induced potential blockage caused by overlapping protected zones of two crossing critical sections in one embodiment of the present invention;

FIG. 16(*b*) shows an example of the present invention resolving the induced potential blockage caused by an externally-generated hold for Vehicle B in one embodiment of the present invention;

DETAILED DESCRIPTION OF THE INVENTION

Figure 1:
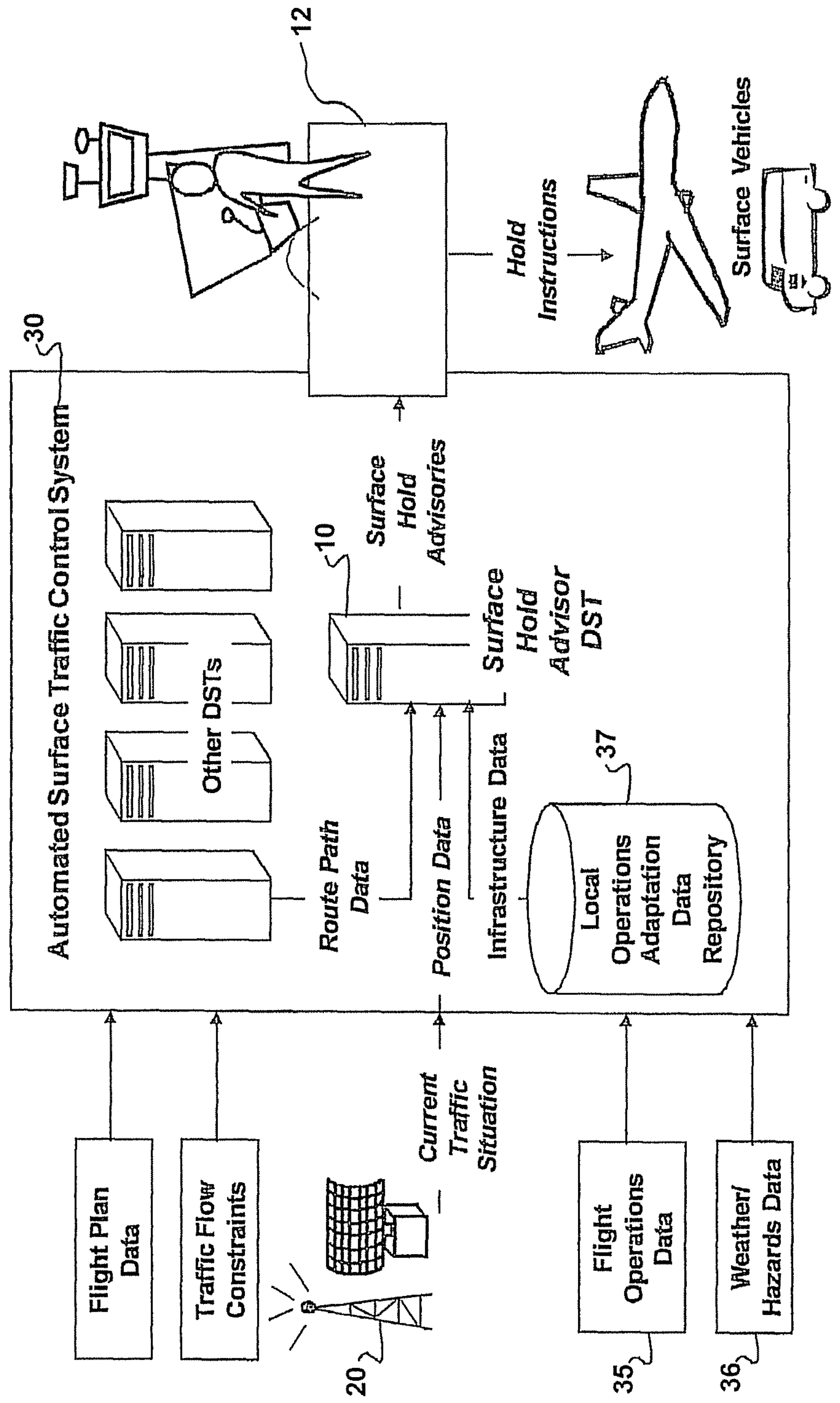
FIG. 1 depicts one embodiment of the present invention as part of an automated surface traffic control system.

The present invention was developed to address the above problems with the existing airport traffic management systems as part of an automated system to support traffic control of aircraft and other vehicles moving on an airport surface.

The present invention provides means to better manage and resolve surface traffic congestion as part of an automated surface air traffic control system to improve aircraft traffic throughput and reduce delays and aircraft emissions. The airport surface traffic network contains single-lane taxiway and ramp segments where vehicles can move in either direction on a segment but cannot pass each other on a segment and cannot reverse direction. Airport surface traffic controllers need to be able to resolve crossing and merging conflicts as well as prevent aircraft and other vehicles from being in a situation where they are not able to move forward because of oncoming traffic, i.e. gridlock. More specifically, the process of the present invention receives vehicle position and route path data as inputs, determines potential crossing and merging conflicts and generates advisory instructions that prevent gridlock and resolve potential crossing and merging conflicts among the vehicles on the airport surface. The advisory instructions generated by the present invention also support vehicle separation assurance.

The Surface Hold Advisor Using Critical Sections of the present invention (hereinafter Advisor) focuses on preventing gridlock network-wide on the airport surface while concurrently preventing all crossing and merging conflicts between vehicles that are moving on an airport surface. The Advisor is a transformative process by which vehicle position and path inputs are used to generate hold advisories. The hold advisories define points on the surface network at which vehicles must stop to avert gridlock as well as avert crossing and merging conflicts. Advisories are recommended instructions. The hold advisories are provided to traffic controllers for issuance as actual hold instructions to vehicles subject to controller discretion. The process is automatically and continually updated in rapid succession such that inputs are refreshed at regular but short time intervals (e.g., every second) or in response to very-frequently occurring events (e.g., taxiway intersection crossings). A new set of hold advisories is generated at each automatic update cycle. In one embodiment, the new set of hold advisories is automatically updated at least once per second. In another embodiment, the new set of hold advisories is automatically updated at least once every thirty seconds. In yet another embodiment, the new set of hold advisories is automatically updated at a rate of at least thirty hertz.

The Advisor provides recommended instructions (hold advisories) for stopping aircraft and other vehicles traversing an airport surface. The Advisor methodology processes input data describing vehicle positions and assigned/planned route paths through the airport surface traffic network, and generates hold advisories. The airport surface traffic network resources (i.e., taxiway and ramp segments) are single-lanes where vehicles can move in either direction but cannot reverse direction and cannot pass each other. The Advisor performs pair-wise comparisons of the projected path of each vehicle with that of other surface vehicles. Where the Advisor determines a conflict for use of a segment of the airport surface traffic network exists, the Advisor identifies the segment of the airport surface traffic network as a critical section. A critical section defines a portion of the surface network where two vehicles are in contention with respect to crossing or merging conflicts or approach a segment from opposite directions, creating gridlock. The Advisor then defines a protected zone around each identified critical section. The protected zone includes entry points where a vehicle can be held before reaching the identified conflict. The Advisor determines which vehicle or vehicles to hold at an entry point to the protected zone for the critical section (i.e., stop at the entry point to the protected zone for the critical section) and which vehicle to allow to proceed through the critical zone. The Advisor than issues advisories to the traffic controllers defining the vehicles to hold and where to hold them to prevent the conflict. These advisories prevent network gridlock and resolve crossing and merging conflicts at intersections. The Advisor does not monitor and prevent potential conflicts as vehicles move through identified critical sections.

The advisory enables a traffic controller to issue a hold instruction prior to a vehicle reaching the hold point on the entry boundary to the protected area for the critical section. The Advisor continually reassesses the state of the airport traffic network and issues or discontinues hold advisories. A discontinuance of a hold advisory allows a vehicle to continue without stopping or restart forward movement after stopping at a hold point.

The present invention has several embodiments in which the methodology is a modular component of a basic automated surface traffic control system, an advanced automated surface traffic control system and fast-time or real-time computer simulations of automated surface traffic control systems. FIG. 1 illustrates the integration of the Advisor as a hardware/software component of a generic automated surface traffic control system. Such automated systems include the Tower Fight Data Manager (TFDM), Advanced Surface Movement Guidance and Control Systems (A-SMGCS) and Aerobahn. TFDM and A-SMGCS support air traffic controller operations and Aerobahn supports airline ramp traffic controller operations. The surface automated traffic control systems are supported by or include auxiliary systems or sub-systems that provide surveillance, fight plan, meteorological, traffic flow constraints and associated data. For example, Airport Surface Detection Equipment—Version X (ASDE-X) provides surface vehicle surveillance data.

In some embodiments, the present invention is a hardware/software decision support tool (DST) operating as a subsystem within the automated surface traffic control system. In this embodiment, the Advisor includes software running on a computer 10 having at least a 32-bit architecture with a minimum speed of 1.8 GHz. having access to at least 2 GB of memory. In some of these embodiments, the computer 10 receives data from airport surface surveillance systems 20, such as ASDE-X, automated airport surface traffic control systems 30, which may include other decision support tools (DSTs), and other airport operations systems, such as flight operations data 35, weather data 36, and local operations adaptation data repository 37, as shown in FIG. 1.

The Advisor processes vehicle state inputs provided by airport surveillance systems, route assignment inputs provided by automated airport surface traffic control systems or other DSTs, airport infrastructure inputs maintained by the automated system defining the airport surface traffic network and parameters for analyzing potential traffic conflicts, and generates hold advisories to surface air traffic controllers and/or ramp controllers 12, as shown in FIG. 1. The automated airport surface traffic control systems include interfacing sub-systems that provide the hold advisories to traffic controllers. In the embodiment shown in FIG. 1, input data describes the current position of vehicles and assigned/planned paths and airport specific infrastructure components (network structure, operating parameters). The Advisor processes the input data and generates hold advisories for vehicles operating on the airport surface that are provided to traffic controllers.

Figure 2:
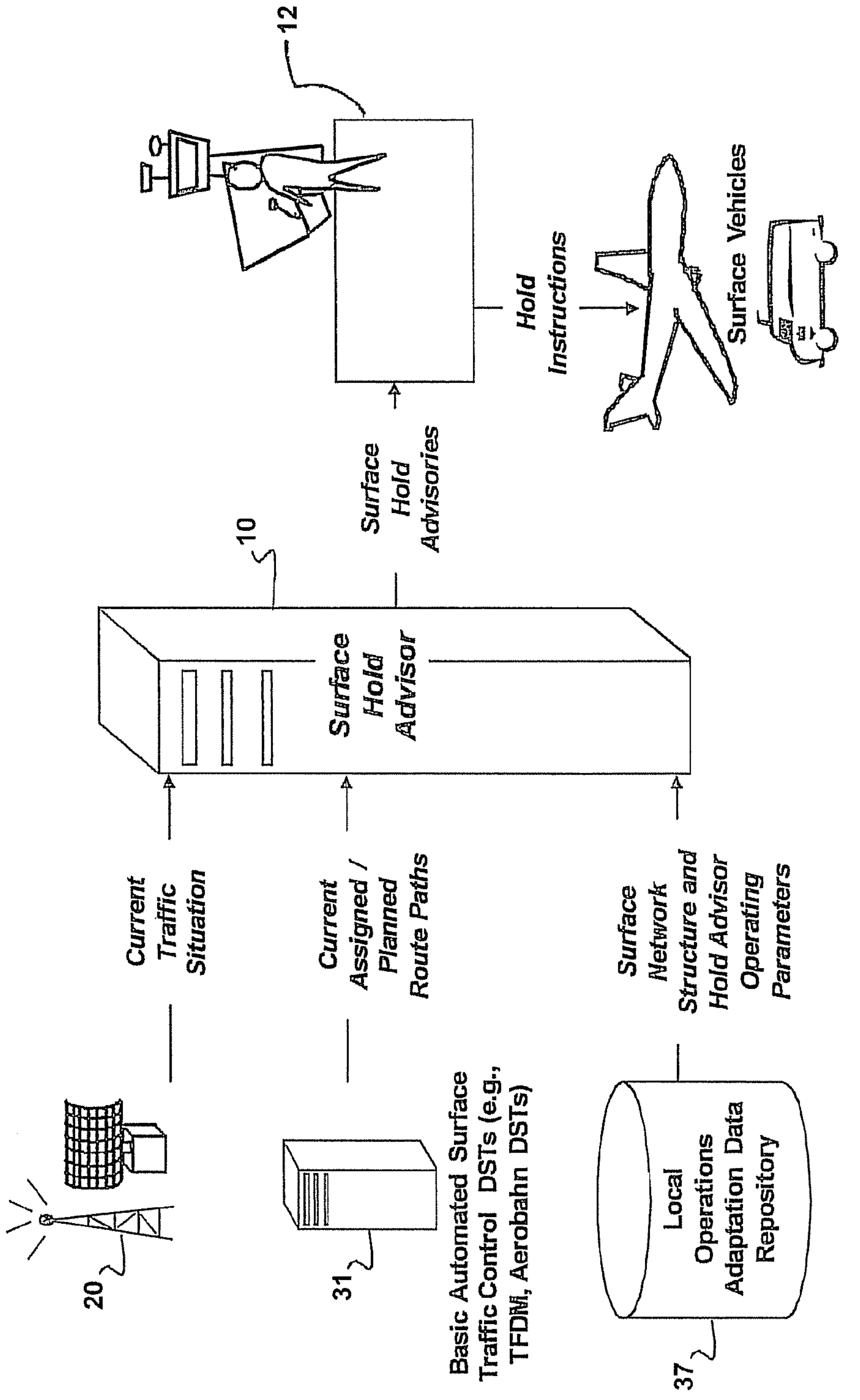
FIG. 2 shows one embodiment of the present invention as a decision support tool within a basic automated surface traffic control system.

FIG. 2 illustrates an embodiment of the Advisor that is part of a basic automated surface traffic control system comprising surveillance and communication equipment and software/hardware components. In this embodiment, the computer 10 running the Advisor software receives data from airport surface surveillance systems 20, basic airport surface traffic control systems 31, such as Tower Flight Data Manager (TDFM) and Aerobahn, and other airport operations systems, such as local operations adaptation data repository 37, as shown in FIG. 2. The basic automated surface traffic control system 31 also includes other DSTs that monitor vehicle states, define optimized route paths and schedules but continues to use autonomous pilot/operator control of vehicles to provide self-separation in-trail between vehicles to prevent vehicles overtaking one another on the single-lane taxiway and ramp segments of the airport surface traffic network. Surface vehicles conduct self-separation subject to the requirement that that the surface vehicles shall stop within and block an intersection. As part of the self-separation operating concept, the basic automated surface traffic control system requires the vehicle pilot/operator to not stop within a taxiway intersection so as to not block transit of that intersection for use by crossing vehicles. The Advisor generates hold advisories to prevent gridlock and crossing and merging conflicts subject to the understanding that vehicles will not enter an intersection when following a preceding vehicle unless sufficient spacing is guaranteed to be available to completely exit the intersection.

Figure 3:
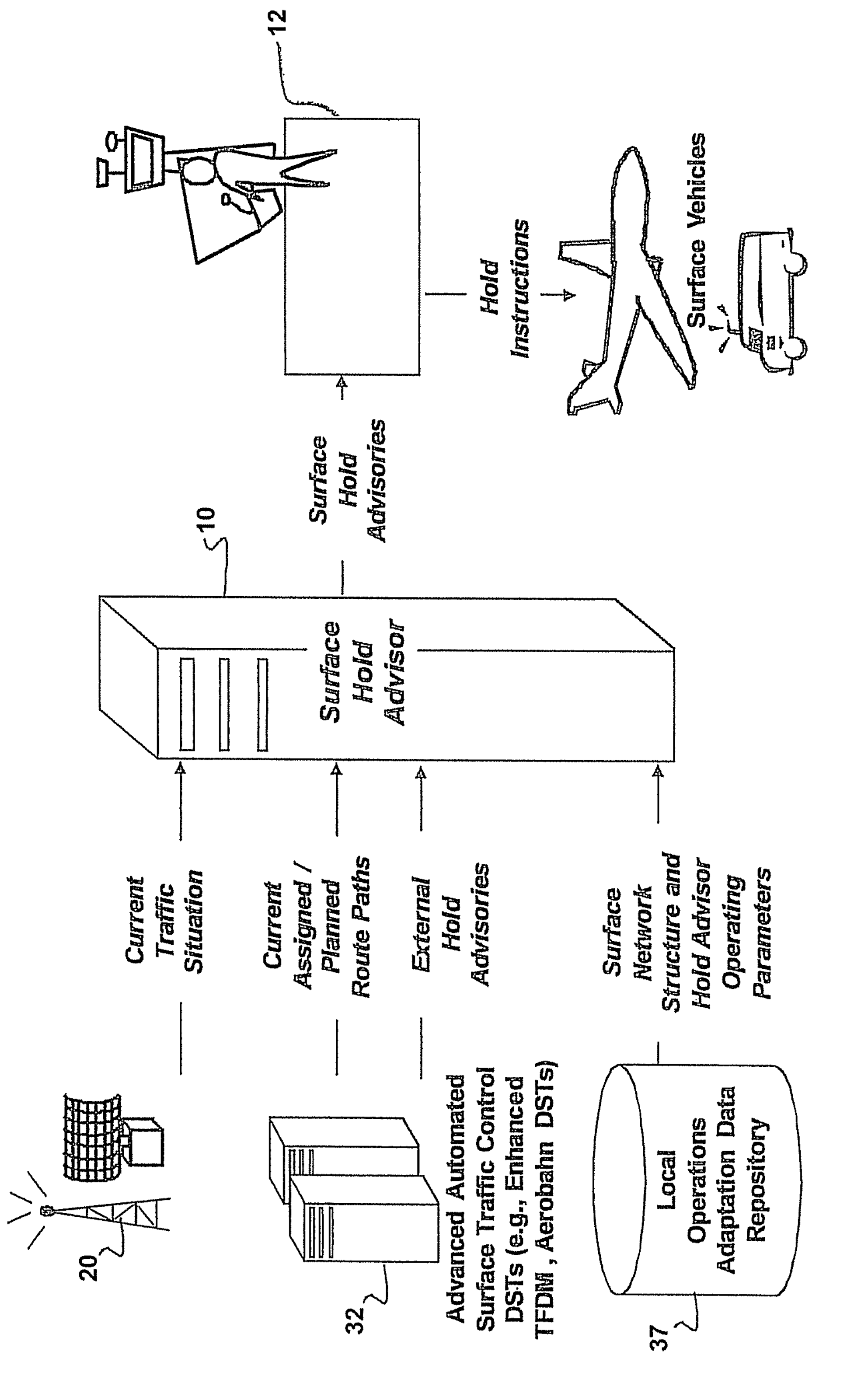
FIG. 3 shows one embodiment of the present invention as a decision support tool within an advanced automated surface traffic control system.

FIG. 3 illustrates an embodiment of the Advisor that is part of an advanced automated surface traffic control system. In this embodiment, the computer 10 running the Advisor software receives data from airport surface surveillance systems 20, advanced airport surface traffic control systems 32, and other airport operations systems, such as local operations adaptation data repository 37, as shown in FIG. 3. Here, in addition to the equipment components, functions and interfaces of the basic automated surface traffic control system, the advanced automated surface traffic control system includes other decision support tools to guide vehicle movement on the airport surface traffic network by issuing turn, speed, acceleration/deceleration, and hold advisories. The Advisor integrates these externally-generated hold advisories into its internal process by examining and modifying as necessary these holds to prevent unnecessary blockage of intersections.

Figure 4:
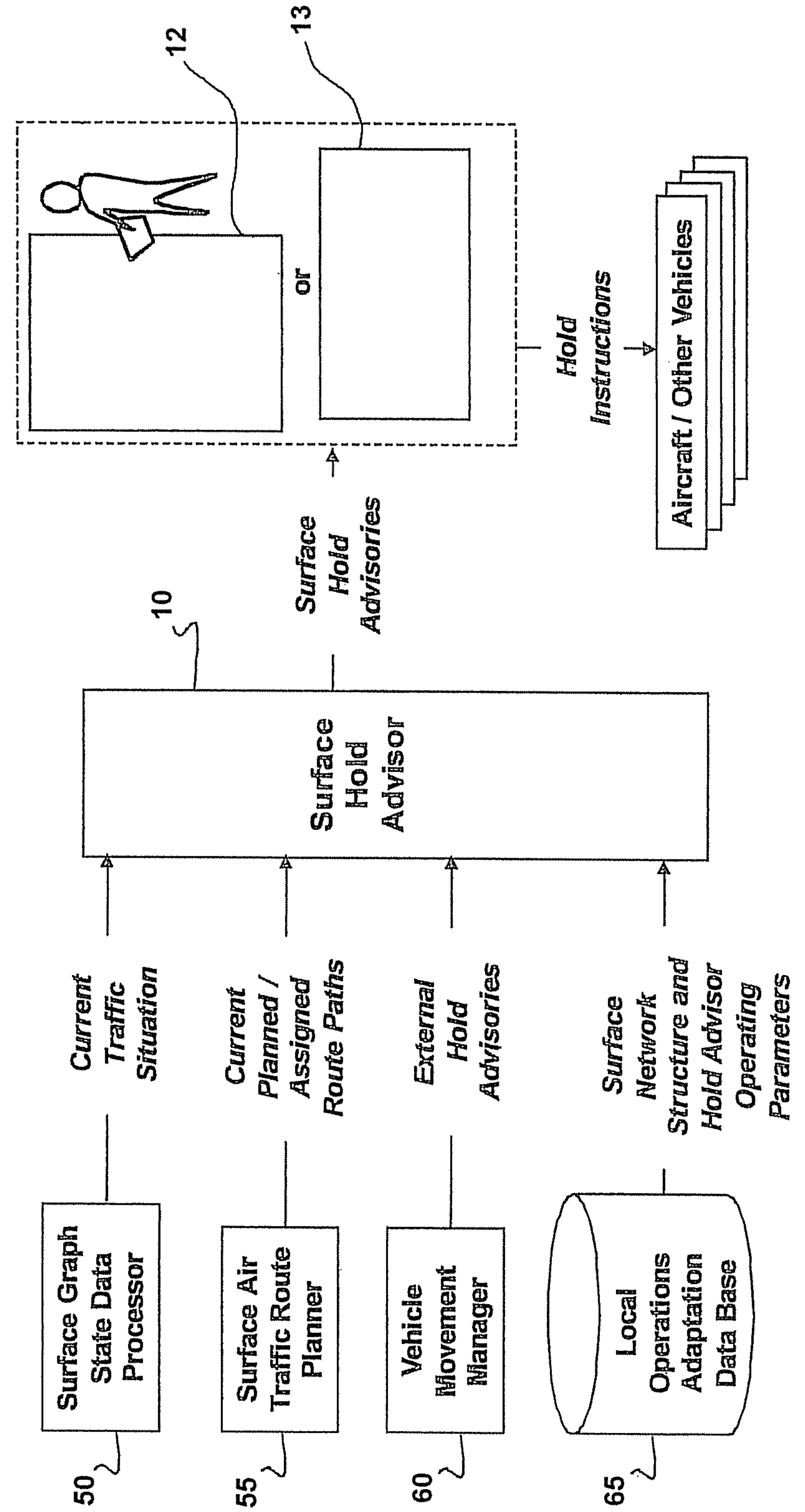
FIG. 4 shows one embodiment of the present invention as a software module within a fast-time or real-time computer simulation.

FIG. 4 illustrates an embodiment of the Advisor that is part of fast-time or real-time computer simulation of automated surface traffic control systems. This embodiment is essentially the same as that of the advanced surface automated system, except that the inputs to the computer 10 running the Advisor software are software modules, surface graph state data processor 50, surface air traffic route planner 55, vehicle movement manager 60, and local operations adaptation data base 65, interacting through computer data exchanges that provide simulated or previously recorded vehicle traffic data, as shown in FIG. 4. The fast-time mode is implemented to examine the effectiveness of alternative decision support tool algorithms or other operational improvements (e.g., new taxiways, modified separation rules) in meeting design objectives and operational benefits (e.g., potential delay and emissions reduction impacts). The real-time mode is implemented within a human-in-the-loop laboratory simulation to examine human surface air traffic controller and ramp controller 12 capabilities in operating with the present invention and associated decision support tools as well as performance and technical capabilities of equipment and components in supporting these operations, as shown in FIG. 4. Alternatively, the surface hold advisor 10 provides hold advisories to a fast-time surface traffic controller module 13 for fast-time simulations.

In one embodiment, the Advisor's inputs describing vehicle movement are limited to vehicle position and assigned/planned path data, including the most recently crossed intersection. Other inputs to the Advisor are limited to infrastructure descriptions of the surface network structure and parameters for operating the present invention. The assignment of paths, modification of assigned paths and scheduling of paths is outside the scope of the present invention. Paths are determined external to the Advisor by controllers based on prescribed or preferred routings or based on routing optimization advisories provided by decision support tools in an automated traffic control environment. Similarly, optimized time schedules or time-based trajectory predictions for path traversals are the product of external decision support tools. Regardless of current operations or more-automated future operations, the Advisor processes position and path descriptors without regard to other route information. The Advisor generates hold advisories without enforcement of network path direction-of-movement rules or application of time-based trajectory prediction, route selection or scheduling or optimization algorithms. The present invention determines hold advisories without otherwise changing the assigned/planned paths in any manner.

The present invention provides a general advisory service by which a traffic controller can issue instructions to allow each vehicle to move along its assigned route but hold (stop) at a strategic point, if required, to prevent gridlock and resolve potential crossing and merging conflicts among the vehicles on the airport surface. The determination of hold advisories does not require any of the following:

time schedules for each vehicle along its projected path;
network optimization or scheduling solutions;
alternative route selection solutions;
vehicles to reverse direction of travel; or
network path direction-of-movement rules.

The determination of hold advisories also does not allow vehicles to pass each other on a single path segment. The determination of hold advisories by the present invention avoids gridlock while providing vehicle separation assurance at crossing and merging intersections or terminal/interchange points along each vehicle's projected path and allows multiple vehicles following each other to occupy common sections of the surface traffic network.

The Advisor generates hold advisories designed to prevent projected crossing and merging conflicts and resolve projected gridlock to the extent possible (i.e., where pathological gridlock conditions are not imbedded in the network movement structure). In these embodiments, the Advisor describes the airport surface traffic network on which vehicles move on a graph composed of vertexes (nodes, e.g., intersections) and edges (links e.g., taxiway and ramp segments) for computational purposes. As shown in FIGS. 1-4, the Advisor processes input data describing the structure of the graph (airport surface traffic network), the current position and most recent vertex crossing of each vehicle on the graph, the planned or assigned forward path from the current position for each vehicle through the graph (where the planned/assigned path is determined externally to the Advisor), operating parameters for detecting and resolving conflicts, defining critical sections and protected zones for each identified critical section, prioritizing hold assignments, and any relevant holds applied by functions external to the Advisor. At any instant, the Advisor knows the current state, the most recent vertex path history and the projected forward path of each vehicle.

Figure 5:
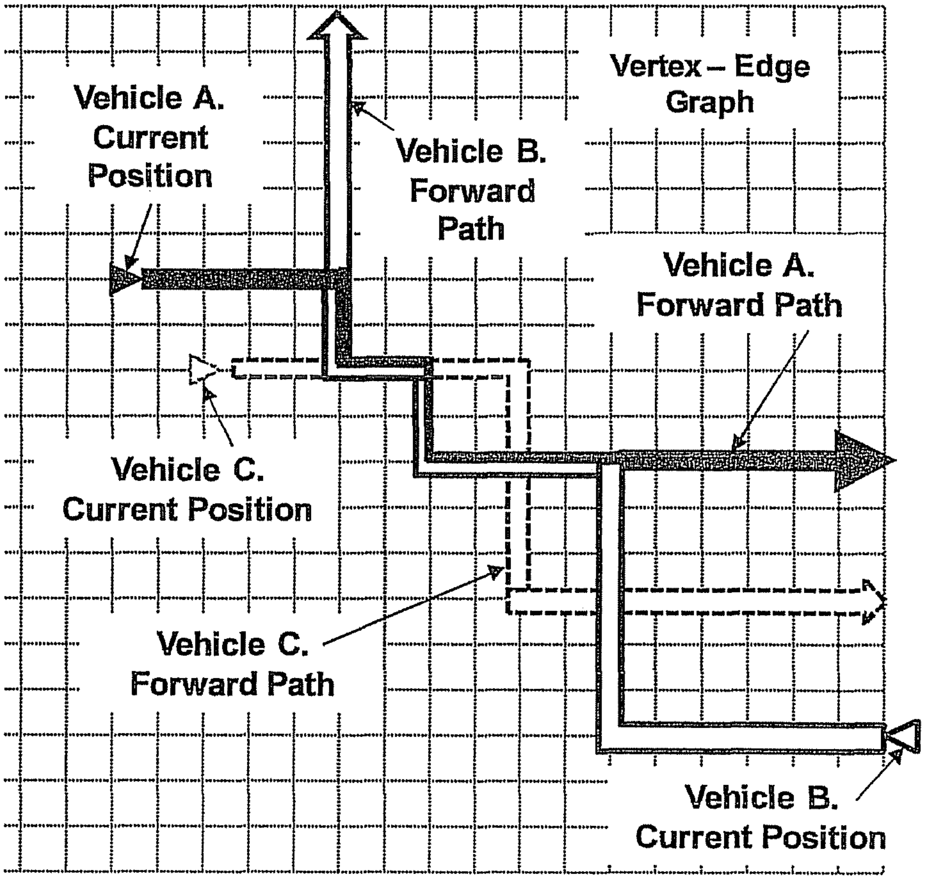
FIG. 5 shows the current position and assigned/planned forward route paths for three vehicles on the vertex-edge (e.g., node-link) graph of one embodiment of the present invention.

FIG. 5 illustrates input data describing the current positions and forward paths for three vehicles on a vertex-edge graph, which represents the surface traffic network traversed by the vehicles on the airport surface. The Advisor examines the current position and most recent vertex of all vehicles and their planned/assigned forward paths on the entire surface graph (airport surface), identifies conflicts, defines critical sections and protected zones for each identified critical section, determines hold requirements to resolve identified conflicts, and issues advisories including where to place holds (stop points) on particular vehicles. The Advisor uses current position data for each vehicle and assigned paths in near real-time to determine and resolve potential conflicts. The Advisor does not require projected time schedules to identify and resolve critical sections containing potential conflicts.

The Advisor issues hold advisories intended to prevent entry into a critical section if the critical section is being used or blocked by other vehicles or to avert gridlock in the critical section. The Advisor controls entry into defined protected zones for critical sections and does not attempt to maintain required in-trail separation between successive vehicles as they move through the grid. Such separation service is provided by functions external to the Advisor (e.g., traffic controller monitoring and intervention or vehicle self-separation capabilities). External services to the Advisor are responsible to prevent vehicles overtaking situations once a vehicle enters and moves through a critical section.

Starting with the most recently crossed vertex and given the current position of a vehicle, the Advisor searches forward along a planned/assigned path to identify all conflicts for segments or nodes on the graph, identifies each conflict as a critical section and defines a protected zone surrounding an identified critical section. A critical section is a common region of the graph shared by two surface paths, and consists of one or more vertexes and edges where two vehicles are in contention with respect to crossing or merging conflicts or approach a segment from opposite directions, creating gridlock. These vertex and edge graph components may represent a network traffic intersection (e.g., intersection of taxiways segments), a common lane segment (e.g., taxiway and ramp segment), a common terminal point (e.g., hold short line), or a continuous series of intersection/terminal points and their enclosed lane segments. The Advisor identifies at least the following three different types of critical sections: a crossing critical section, a merging critical section, and a gridlock critical section.

Figure 6:
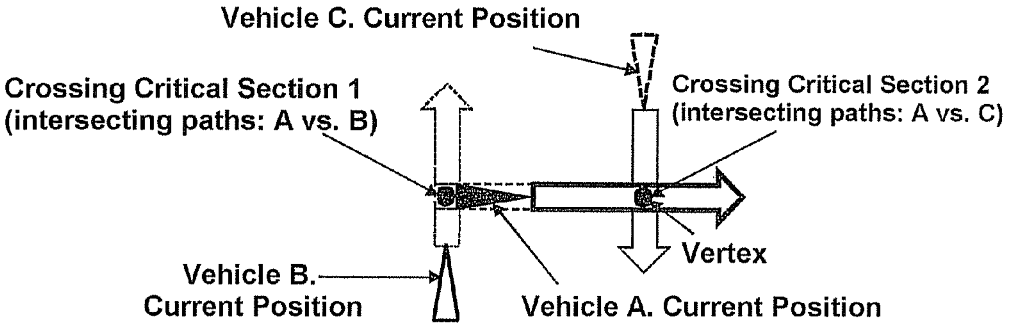
FIG. 6 depicts two separate crossing critical sections involving Vehicle A in the present invention.

A crossing critical section occurs at the intersection of two different paths at a single vertex and the vehicles are traveling in directions that are different but are not opposite to one another. The vertex crossing is the critical section. The vertex may be the most recently crossed vertex of one of the vehicles or any vertex along the path of each vehicle at or downstream of their current positions, as shown in FIG. 6. In FIG. 6, Vehicle A is contending with two crossing vehicles (Vehicles B and C) at different vertexes. One vertex is the most recently crossed vertex of Vehicle A, where Vehicle A contends with Vehicle B. The other vertex is on the planned/assigned forward path of Vehicle A where Vehicle A contends with Vehicle C. Each of these vertexes is a crossing critical section.

Figure 7:
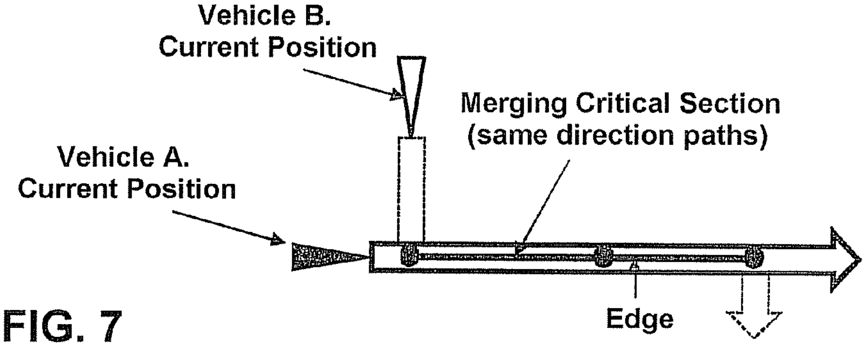
FIG. 7 shows an example of a merging critical section in the present invention.

A merging critical section occurs when two separate paths converge onto a shared section and the vehicles are moving in the same direction of travel. The merging critical section is bounded by the entry and exit vertexes and consists of the vertexes and edges enclosed within and including the entry and exit vertexes, as shown in FIG. 7. The entry vertex may be the most recently crossed vertex of one of the vehicles or any vertex along the path of each vehicle at or downstream of their current positions. In FIG. 7, the merging critical section is caused by a pair of vehicles (A and B) on same-direction paths contending for a shared set of contiguous vertexes and edges. This shared set of contiguous vertexes and edges, consisting of the two end vertexes and enclosed vertexes and edges is the merging critical section, as shown in FIG. 7.

Figure 8:
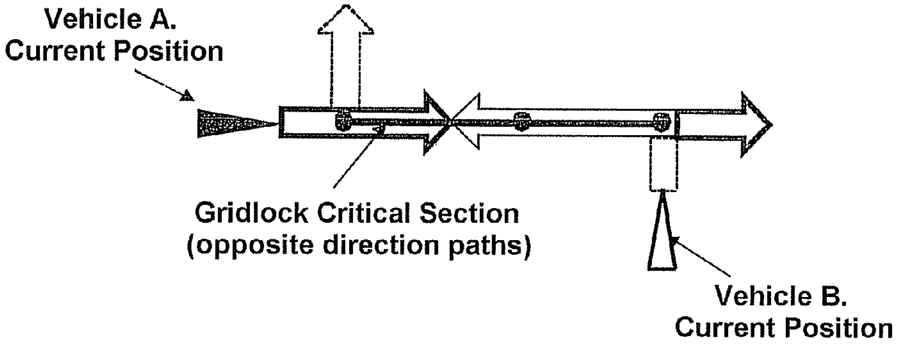
FIG. 8 shows an example of a gridlock critical section in the present invention.

A gridlock critical section occurs when two separate paths share a common section and the vehicles are traveling in directions opposite to one another (i.e., vehicles moving toward each other head-to-head), as shown in FIG. 8. The gridlock critical section is bounded by the two vertexes at each end of the section and consists of the vertexes and edges enclosed within and including these end vertexes, as shown in FIG. 8. The entry or exit vertex may be the most recently crossed vertex of a vehicle or any vertex along the path of each vehicle at or downstream of their current positions. In FIG. 8, the gridlock critical section is caused by a pair of vehicles (A and B) on opposite-direction paths contending for a shared set of contiguous vertexes and edges. This shared set, consisting of the two end vertexes and enclosed vertexes and edges, is the gridlock critical section, as shown in FIG. 8.

After searching all of the assigned vehicle paths using pair-wise comparisons of the projected path of each vehicle, any single vehicle may be found to compete for numerous critical sections, and any single critical section may be found to have multiple contending vehicle pairs. After identifying each conflict as a critical section the Advisor defines a protected zone for each critical section, which the Advisor uses to determine additional potential conflicts. The protected zone encompasses an area including at least one of an entry vertex to the critical section or an exit vertex to the critical section. The protected zone may include both an entry vertex and an exit vertex to the critical section, and can include the entire critical section. In some embodiments, the protected zone is a polygon shaped area centered on the vertex. In another embodiment, the protected zone is a circular-shaped area centered on the vertex. In other embodiments, the protected zone is a square or rectangular-shaped area centered on the vertex. In yet another embodiment, the protected zone is a simply a defined distance along each edge radiating from the vertex (e.g., at an airport, this distance could define the location of a hold short line on a taxiway approach to an intersection). The user of the Advisor specifies the shape and dimensions of the protected zones for identified critical sections. In some embodiments, the shape and dimensions of the protected zones are different for each type of critical section. In other embodiments, the shape and dimensions of the protected zones are predefined for each type of critical section. For generality and purpose of explanation, we use the polygon in the remainder of this description of the Advisor.

In some embodiments, the shape of each polygon is determined in part by the geometry of the edges converging at the vertex. For example, a square-shape would accommodate perpendicular edges converging at a vertex. More complex polygons would accommodate configurations of multiple edges with various angles of convergence at a vertex. In some of these embodiments, the radial dimension of the polygon along each graph edge conforms to inter-aircraft separation requirements and may differ among edges and different aircraft types, which could result in irregular convex or concave polygons. The distance from vertex to a polygon boundary is sufficient to enable a vehicle to hold at the boundary of the polygon without infringing the protected zone (e.g., nose-to-tail or wingtip-to-wingtip spacing) of a vehicle in or approaching the critical section polygon. In some embodiments, the vertex-to-polygon boundary distance is a static distance value for all vertexes. In other embodiments, the vertex-to-polygon boundary distance is a dynamically-defined distance that depends on vehicle dimensions and the convergence geometry at each vertex.

Figure 9:
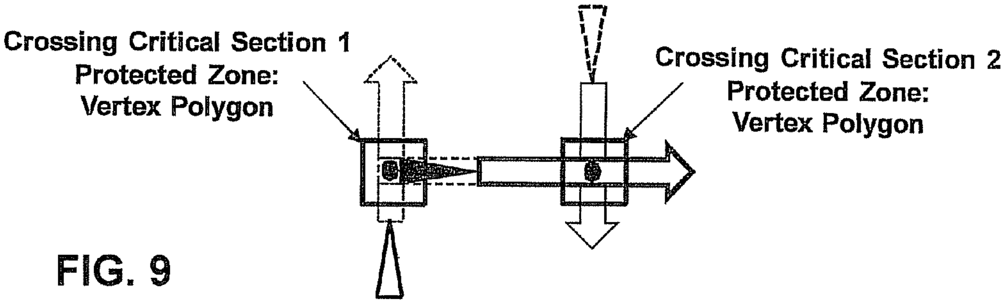
FIG. 9 shows an example of a protected zone of a crossing critical section in one embodiment of the present invention.
Figure 10:
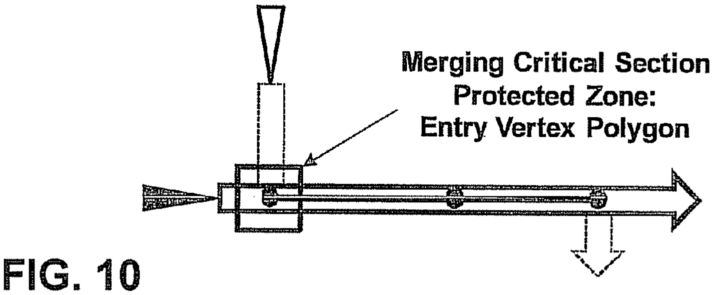
FIG. 10 shows an example of a protected zone of a crossing critical section in one embodiment of the present invention.
Figure 11:
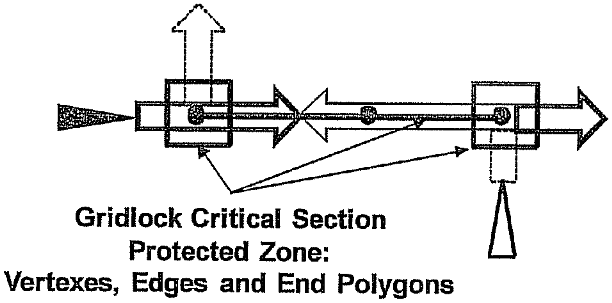
FIG. 11 shows an example of a protected zone of a gridlock critical section in one embodiment of the present invention.

The protected zone of each critical section is defined as follows:

- Crossing Critical Section Protected Zone—The protected zone is an area centered on the crossing critical section vertex. For example, the protected zone is an area in the shape of a polygon centered on each of the crossing critical section vertexes, as shown in FIG. 9.
- Merging Critical Section Protected Zone—The protected zone is an area centered on the entry vertex. For example, the protected zone is a polygon centered on the entry vertex to the merging critical section, as shown in FIG. 10.
- Gridlock Critical Section Protected Zone—The protected zone is the critical section (i.e., a series of vertexes and edges), an area centered on the entry vertex and an area centered on the exit vertex. In FIG. 11, the protected zone consists of a polygon centered on the entry vertex, a polygon centered on the exit vertex, and the enclosed vertexes and edges of the gridlock critical section.

Figure 12:
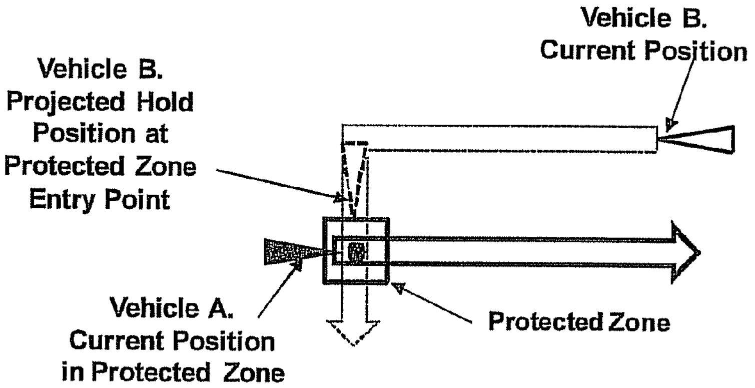
FIG. 12 shows an example in which a part of Vehicle A is in the protected zone of a crossing critical section at a current instant, causing potential blockage to Vehicle B in the present invention.

As part of the hold advisory generation process, the Advisor determines if a vehicle's projected entry into a protected zone is blocked by other vehicles. Blockage is caused by projected potential conflicts with other vehicles. At any instant, the advisor determines blockage by comparing the current states, most recent vertex crossing, and planned/assigned forward paths of vehicles without regard to scheduled, projected or required times along assigned vehicle paths. Input data for vehicles that is received by the Advisor includes position and path data for vehicles currently operating on the airport surface and vehicles pending entry to the airport surface. The Advisor's blockage determination criteria vary among critical section protected zones as follows:

- Blockage of a Crossing Critical Section Protected Zone—The Advisor generates a hold advisory for a vehicle to stop upon reaching the entry point to the protected zone if any part of the vertex polygon is occupied by another vehicle at the current instant (i.e., all or any part of another vehicle is in the polygon), as shown in FIG. 12. The Advisor issues a hold advisory for Vehicle B, which requires Vehicle B to stop upon reaching its entry point to the protected zone, as shown in FIG. 12. FIG. 12 shows both the current position and the projected hold position of Vehicle B resulting from the issuance of a hold advisory.

Figure 13:
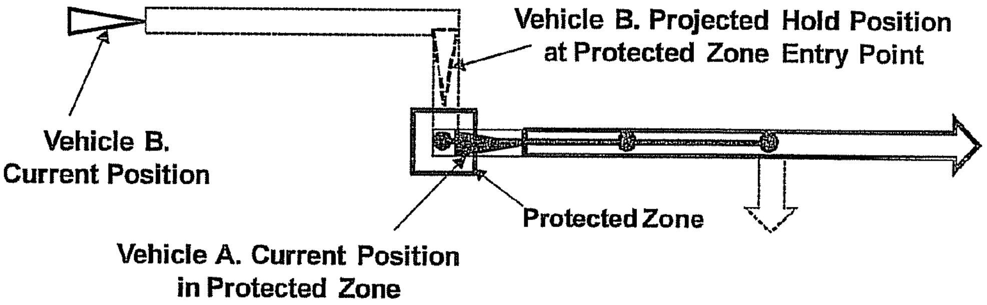
FIG. 13 shows an example in which a part of Vehicle A is in the protected zone of a merging critical section at a current instant, causing potential blockage to Vehicle B in the present invention.

Blockage of a Merging Critical Section Protected Zone—The Advisor generates a hold advisory for a vehicle to stop upon reaching the entry point to the protected zone if any part of the entry vertex polygon is occupied by any part of another vehicle at the current instant, as shown in FIG. 13. The Advisor issues a hold advisory for Vehicle B, which requires Vehicle B to stop upon reaching its entry point to the protected zone, as shown in FIG. 13. FIG. 13 shows both the current position and the projected hold position of Vehicle B resulting from the issuance of a hold advisory.

However, separate from a merging condition, the Advisor does not examine coincidental paths where vehicles strictly follow each other (e.g., a common same-direction path from network entry to exit, or a vehicle following another vehicle on the same path through a series of vertexes and edges) because in-trail separation service is provided by functions external to the Advisor. The use of the external in-trail separation service enables more than one same-direction vehicle to occupy a merging critical section at any instant.

Figure 14:
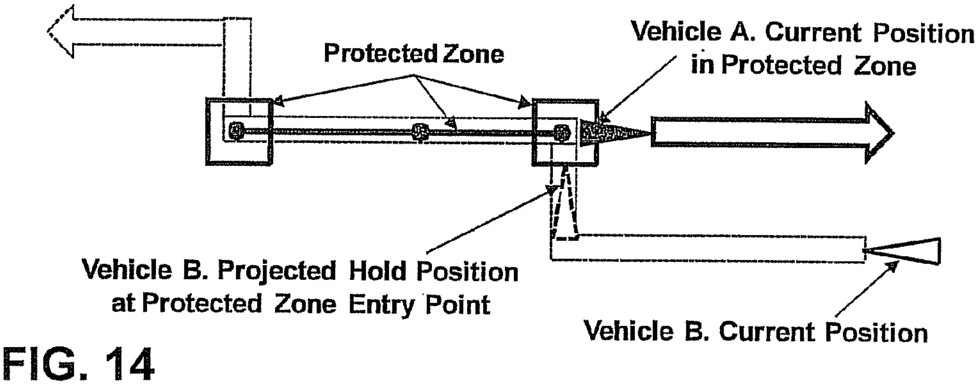
FIG. 14 shows an example in which a part of Vehicle A is in the protected zone of a gridlock critical section at a current instant, causing potential blockage to Vehicle B in the present invention.

Blockage of a Gridlock Critical Section Protected Zone—The Advisor generates a hold advisory for a vehicle to stop upon reaching the entry point to the protected zone if any part of the protected zone is occupied by any part of an opposite direction vehicle at the current instant, as shown in FIG. 14. Each blockage represents a crossing, same-direction merging or opposite-direction gridlock potential conflict between two vehicles. In FIG. 14, each hold advisory generated to resolve a blockage prevents the actual occurrence of the conflict. The Advisor defines a hold advisory for Vehicle B, which requires Vehicle B to stop upon reaching its entry point to the protected zone. FIG. 14 shows both the current position and the projected hold position of Vehicle B resulting from the issuance of a hold advisory.

The Advisor of the present invention can be used as a decision support tool in applications ranging from fast-time and real-time computer simulation to automated real-time decision-making support of actual traffic control operations on an airport surface. In some embodiments, the Advisor is automatically invoked periodically according to a user-defined update interval (e.g., once per second) or on-demand (e.g., at each vertex crossing event). Upon invocation, the Advisor examines all of the vehicles known or planned to be active on the surface graph at the current instant. The Advisor examines planned/assigned paths given the vehicle current positions on the surface graph, and conducts a pair-wise comparison of the path of each vehicle with that of the other vehicles to detect critical sections. The Advisor identifies all pairs of vehicles contending for each critical section.

For each detected critical section, the Advisor's blockage prevention function determines which vehicle or vehicles to issue hold advisories to hold at an entry point to the protected zone. The objective of the Advisor is to resolve each critical section individually by selecting a single vehicle or no vehicles for entry into the protected zone without holding, and issuing hold advisories to hold the other vehicles.

Figure 15A:
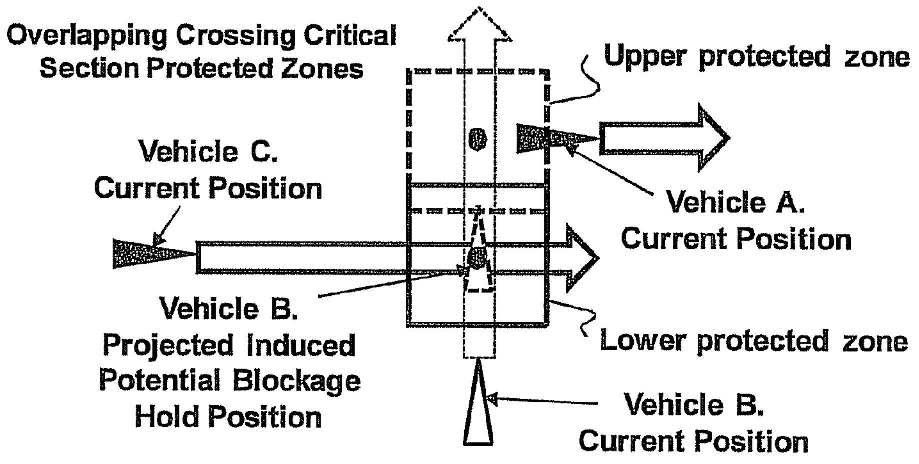
FIG. 15(*a*) shows an example in which overlapping protected zones of two crossing critical sections in which a projected hold position due to resolution of blockage is in the protected zone of another critical section, inducing potential blockage in that protected zone in the present invention.
Figure 15B:
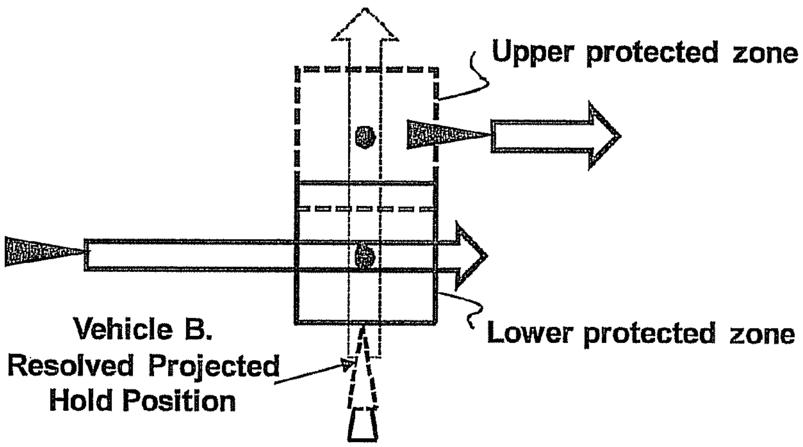

In some embodiment, the selection process is initiated by eliminating those vehicles contending for a critical section that are blocked by each other at the current instant. Since any hold advisory could introduce new blockages into the airport surface traffic network, embodiments of the Advisor include an internal blockage prevention function to mitigate any new vehicle delays caused by overlapping protected zones, such as complex graph subsections composed of closely spaced vertexes connected by short edges (e.g., an airport ramp area interfacing multiple terminal gates or a taxiway area consisting of multiple nearby crossing intersections). For example, the projected position of a vehicle held at a protected zone entry point can place that vehicle in the protected zone of another critical section. An example of the projected hold position causing blockage to a vehicle approaching a critical section for overlapping protected zones of crossing critical sections is illustrated in FIGS. 15(*a*) and 15(*b*). The Advisor examines projected intrusions to protected zones of any critical section, determines if blockage is induced by the intrusion, and removes the blockage by issuing a hold advisory reassigning the intruding hold position where necessary.

More specifically, in FIG. 15(*a*) Vehicle A is currently within the upper protected zone and is blocking Vehicle B. The resulting projected hold position for Vehicle B at the entry point to the upper protected zone places Vehicle B within the lower protected zone, inducing potential blockage to Vehicle C. The Advisor issues a hold advisory reassigning the projected hold position of Vehicle B to the entry point of the lower protected zone, as shown in FIG. 15(*b*). This repositioning, which is performed by functions internal to the Advisor, averts unnecessary induced blockage. The reassigned hold position for Vehicle B is at the entry point to the protected zone in which the blockage would have been induced, as shown in FIG. 15(*b*) for a crossing critical section. The present invention prevents the vehicle, which already has a hold advisory active, to cause unnecessary blockage to another aircraft, particularly if that aircraft is not currently being held.

Figure 16A:
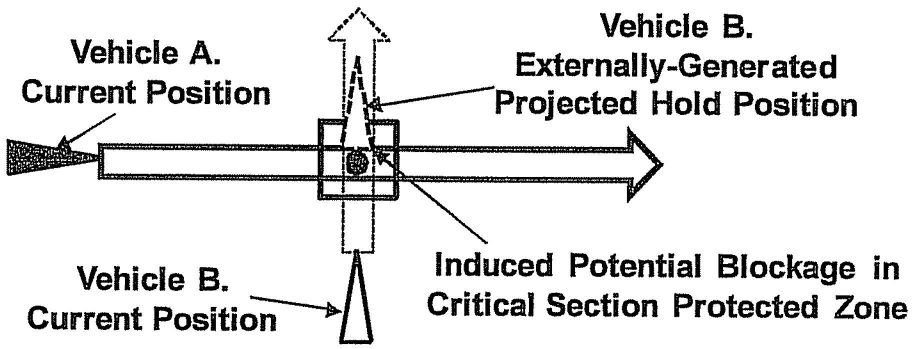
FIG. 16(*a*) shows an example of a situation in which an externally-generated hold places Vehicle B within a critical section, inducing potential blockage to Vehicle A.
Figure 16B:
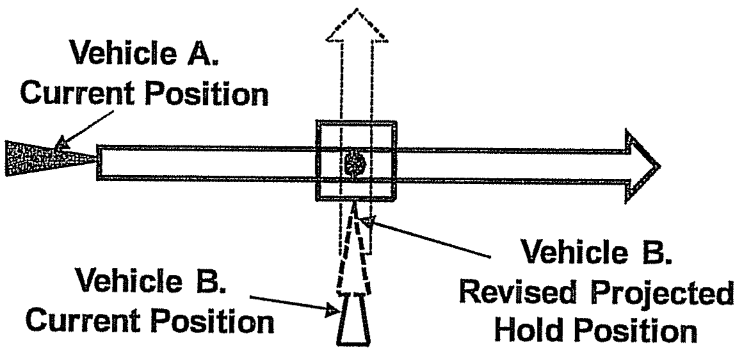

During typical airport surface operations, functions external to the Advisor (e.g., an in-trail vehicle separation service) also generate hold advisories. These externally generated advisories define hold positions at any point on the airport surface (i.e., graph), which do not correspond to entry points to protected zones. These externally defined hold positions can cause all or part of a vehicle to extend into a protected zone, inducing potential blockage to another vehicle. The Advisor receives and reviews externally generated hold advisories and searches for induced potential blockages of the protected zone of any critical sections. FIGS. 16(*a*) and (*b*) illustrate an example in which a projected external hold causes a vehicle to intrude into the protected zone of a crossing critical sector. In FIG. 16(*a*), the externally-generated hold position places Vehicle B within the protected zone, and induces potential blockage to Vehicle A. The Advisor reviews the externally-generated hold positions and issues a hold advisory reassigning the projected hold position of Vehicle B to the entry point of the protected zone, as shown in FIG. 16(*b*).

In most situations, the Advisor will determine at least one vehicle that will be permitted to proceed through the critical section without holding and will issue hold advisories for the remaining vehicles. In most of these situations, one or more vehicles will remain initially eligible for entry into the protected zone, because the protected zone is typically not occupied by a vehicle at the current instant (e.g., the vehicles contending for the identified critical zone are sufficiently distanced from the protected zone so to not interfere with each other). However, in some situations, the constraints of the airport surface traffic network and situation will result in the Advisor issuing hold advisories for all of the vehicles having a conflict for an identified critical section. In these situations, the Advisor will continually reassess the situation and determine the sequence of the vehicles for proceeding through the critical section in order. In some of these cases, the Advisor determines the sequence of vehicles to proceed through the critical section based on user-defined prioritization criteria (which are part of the operating rules input data shown in FIGS. 2-4). For example, a first-come first served prioritization would allow the vehicle closest to the critical section to proceed through the critical section without holding. Alternatively, the vehicle with the earlier network entry time or requested exit time would be allowed to proceed through the critical section without holding while hold advisories are issued for the other competing vehicles.

Figure 17:
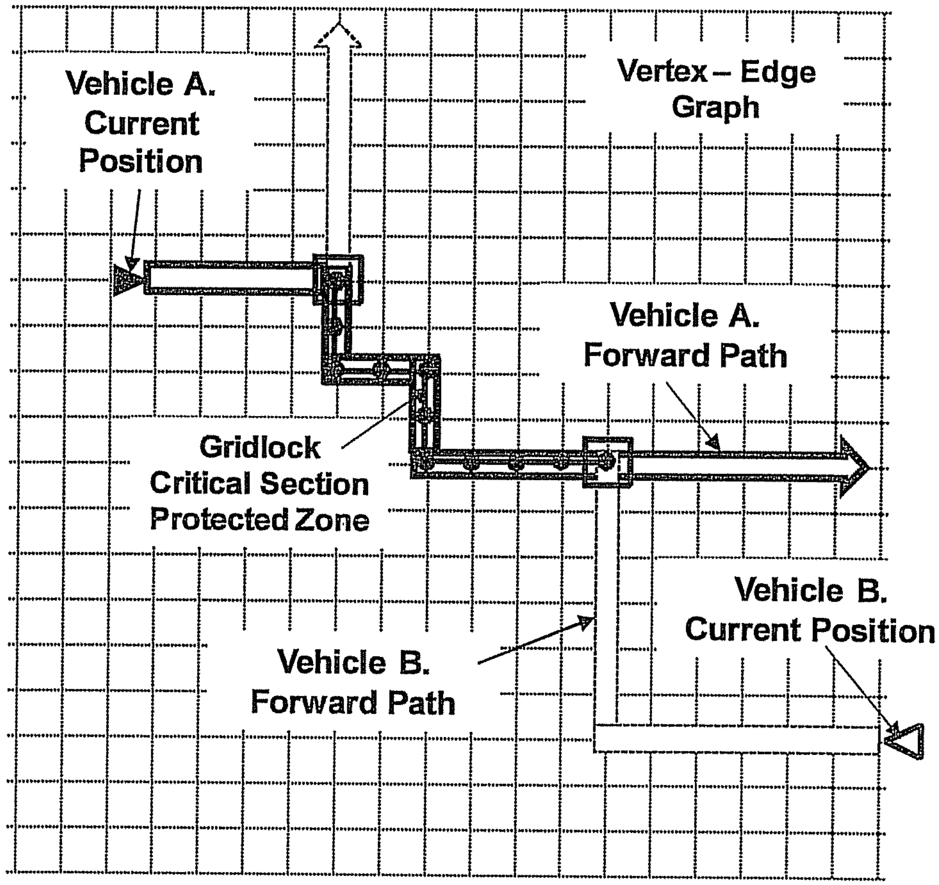
FIG. 17 shows a gridlock critical section protected zone in which the current positions of the two potentially gridlocked vehicles do not block each other at the current instant because neither is in the protected zone of the critical section in the present invention.

FIG. 17 illustrates a case in which a protected zone for an unoccupied gridlock critical section is identified for two vehicles that is currently located at a considerable distance from the protected zone. In this situation, the present invention will not internally generate a hold due to blockage for this situation.

Figure 18:
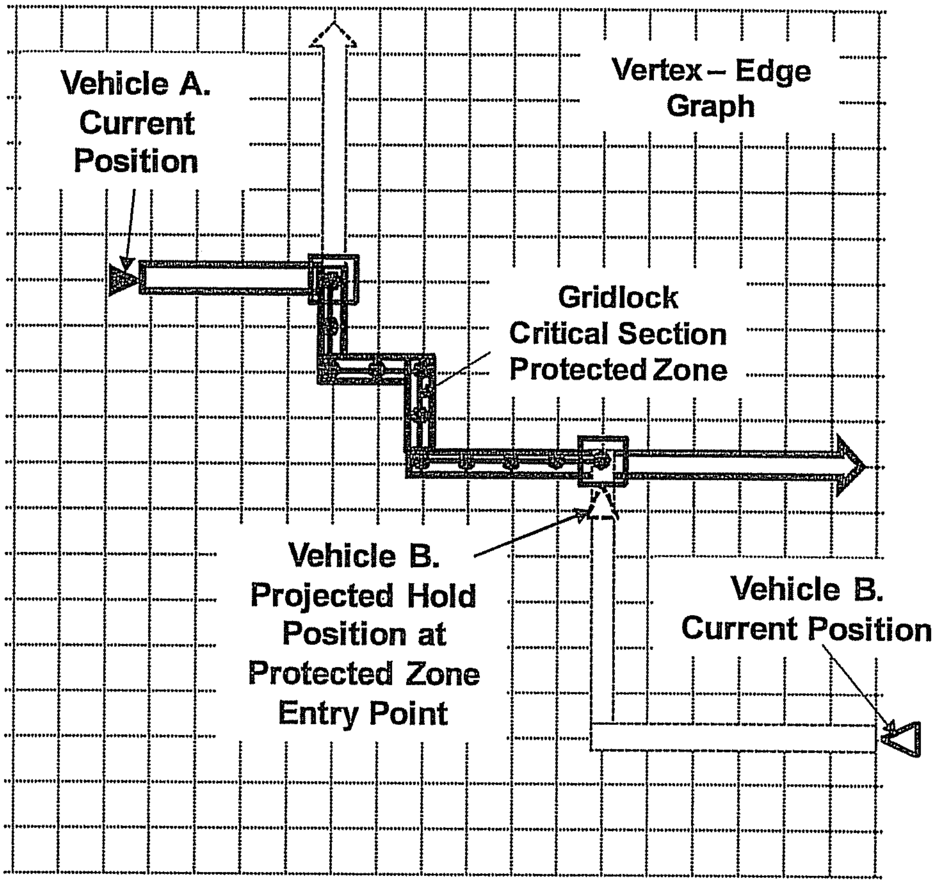
FIG. 18 shows a situation in which two potentially gridlocked vehicles do not block each other at the current instant, but for which one embodiment of the present invention generates a hold for one of the vehicles based on prioritization criteria defined by the user.

In some embodiment, the Advisor determines the distance of each vehicle from the protected zone of the identified critical section and using a closest-distance priority, issues a hold advisory for the vehicle the furthest distance from the protected zone to stop upon reaching an entry point to the protected zone, as illustrated in FIG. 18. In FIG. 18, the Advisor issues a hold advisory for Vehicle B based on the closest-distance priority, to stop because Vehicle A is closest to the protected zone of the gridlock critical section. FIG. 18 shows the current positions of Vehicles A and B and the projected hold position of Vehicle B resulting from the issuance of a hold advisory. The intent of the hold advisory is for the held vehicle to proceed along its assigned path unhindered to the entry point to the critical section, subject to the condition that it stops at the entry point unless otherwise notified. The other vehicle is not issued a hold advisory. In another embodiment, the order priority is based on the earliest requested, estimated or required entry time into a critical section. Other prioritization schemes are based on externally-derived scheduled entry and/or exit times (e.g., for aircraft, gate and/or runway times), impact on delay or throughput, owner's vehicle ranking (e.g., airline bid value of a flight), or random assignment. The above prioritization schemes or other prioritization alternatives may be used individually or in succession to prioritization assignments.

At each invocation, the Advisor identifies holds at critical sections without reissuing hold advisories previously issued to vehicles if their potential conflict condition is no longer projected. The Advisor will issue a set of hold advisories that does not include the previous hold advisory to thereby discontinue the previous hold advisory when the potential conflict condition is no longer valid. The discontinuance of a hold advisory essentially revokes the advisory. Given a sufficiently long look-ahead span over the forward path, the hold discontinuance will often occur well before the vehicle has reached a downstream critical section. In this case, the vehicle would not stop, and can enter and traverse the critical section without delay.

Figure 19:
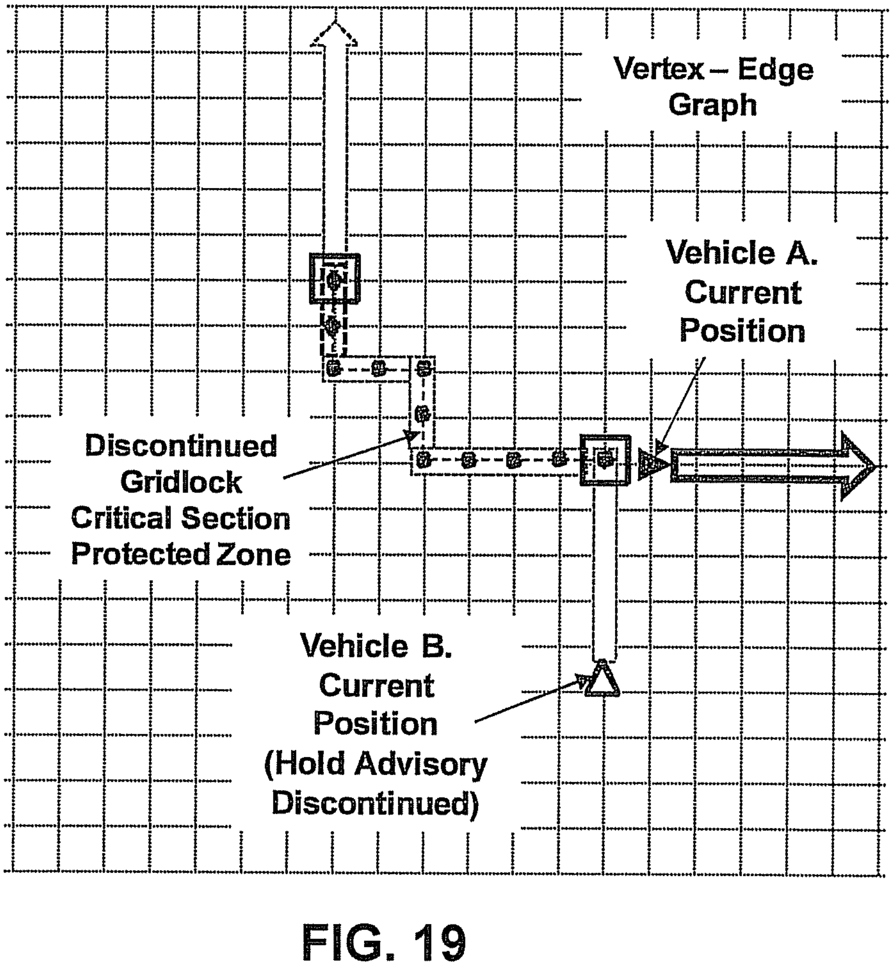
FIG. 19 shows a situation in which a previously-defined gridlock critical section no longer exists at the current instant because Vehicle A has traversed and exited the protected zone in the present invention.

FIG. 19 illustrates the case in which a previously determined gridlock critical section is no longer valid because the current position of Vehicle A shows that Vehicle A has exited from the gridlock critical section. Therefore, the previously issued hold advisory for Vehicle B is discontinued (i.e., not reissued) at this instant, essentially revoking this advisory. Vehicle B continues on its path without any stoppage due to the now discontinued hold advisory. The previously held vehicle, Vehicle B, is no longer subject to a hold advisory and continues transiting toward and through the critical section without experiencing stoppage along its path.

Upon determining all potential conflicts and protected zones, the Advisor issues hold advisories to traffic controllers for the vehicles to be held. Generally, only the first/earliest hold along any one vehicle's path need be issued at the current instant. Couluris, Davis et al. describes critical sections as objects of hold solutions in a fast time simulation, but does not incorporate protection zones to resolve blockages, resolution of holds due to externally generated holds, prioritized resolution of holds and resolution of induced blockages.

Functional Description of the Advisor

The Advisor process is continually and automatically invoked, and comprises the following functional components:

Detection of Critical Sections;
Internal Generation of Holds due to Blockage;
Resolution of Externally Generated Holds;
Prioritized Resolution of Unassigned Holds; and
Resolution of Induced Potential Blockages.

While blockage prevention is a prime function of the Advisor, it is only one component of the overall Advisor process in this embodiment. The disclosed embodiment of the Advisor is applicable to aircraft and other vehicles (service trucks, emergency vehicles, etc) on an airport surface, that are moving or taxiing in the airport surface traffic network (graph) composed of edges (taxiway and ramp segments) and vertexes (intersections and terminal gates) under traffic control. Each of the above functional components is discussed in more detail in the following paragraphs.

Detection of Critical Sections—To start each assessment, the Advisor examines all vertexes along each search path. The search path starts at and includes the most recent vertex the vehicle has crossed and proceeds along the sequence of remaining vertexes on the planned/assigned forward path. This examination is conducted for all vehicles active on the surface as well as pending entries (e.g., departure aircraft waiting at gates) to determine critical sections on the airport surface traffic network (e.g., airport surface). These detections use position and path data without reference to scheduled, projected or required times along assigned vehicle paths.

Internal Generation of Holds due to Blockage—Once all of the critical sections on the airport surface traffic network are detected, the Advisor examines each vehicle pair competing for the use of each critical section and determines which of these vehicles (one, both or none) to hold outside the critical section. These determinations use position and path data without reference to scheduled, projected or required times along assigned vehicle paths. The Advisor conducts Resolution of Induced Potential Blockages, described below, to resolve induced potential blockages.

Resolution of Externally Generated Holds—The Advisor processes hold advisories generated by external functions, and resolves any externally induced blockage by issuing hold advisories that reset the hold position inducing the blockage. However, in some situations the reset hold position itself may induce a new blockage, which the Advisor resolves by conducting Resolution of Induced Potential Blockages, described below.

Prioritized Resolution of Unassigned Holds—A critical section is considered to be resolved when either no vehicle or one vehicle is not subject to being held in accordance with an issued hold advisory. For each critical section still unresolved at this point in the Advisor solution process (i.e., a critical section for which more than one competing vehicle has not been subject to a hold in a hold advisory), the Advisor selects one of these vehicles for entry into the identified critical section and issues a hold advisory to hold the other vehicles that conflict for the identified critical section. The selection is based on user-defined prioritization criteria specific to the environment under assessment. In one embodiment, the order priority is based on closest path distance to the critical section entry vertex. In another embodiment, the order priority is based on estimated vertex crossing times where the crossing times can be provided by functions external to the Advisor. In other embodiments, the Advisor uses one or more of the prioritization alternatives in succession to determine vehicle prioritization assignments. The Advisor conducts Resolution of Induced Potential Blockages, described below, to resolve any induced potential blockages due to prioritized hold advisories.

Resolution of Induced Potential Blockages—The generation of a hold advisory from one or more of Internal Generation of Holds due to Blockage, Resolution of Externally Generated Holds or Prioritized Resolution of Unassigned Holds can result in a projected intrusion into a protected zone. An intrusion occurs if the vehicle's projected hold position infringes the protected zone of a critical section. For each intruded protected zone, the Advisor applies Resolution of Induced Potential Blockages as appropriate to evaluate the intrusion and determine a new hold advisory assignment that eliminates the intrusion. The new hold advisory repositions the vehicle whose hold position intrudes into a protected zone to the entry point to the protected zone of the critical section in which the vehicle potentially intruded. If this revised hold position induces a new potential blockage at the next upstream vertex back along the intruder's path, the advisor iterates the Resolution of Induced Potential Blockages solution. The iteration could examine a series of new hold positions along the intruder's path subject to the limit of the intruder's current position (i.e., the final hold position cannot be upstream/behind the intruder's current position).

Figure 30:
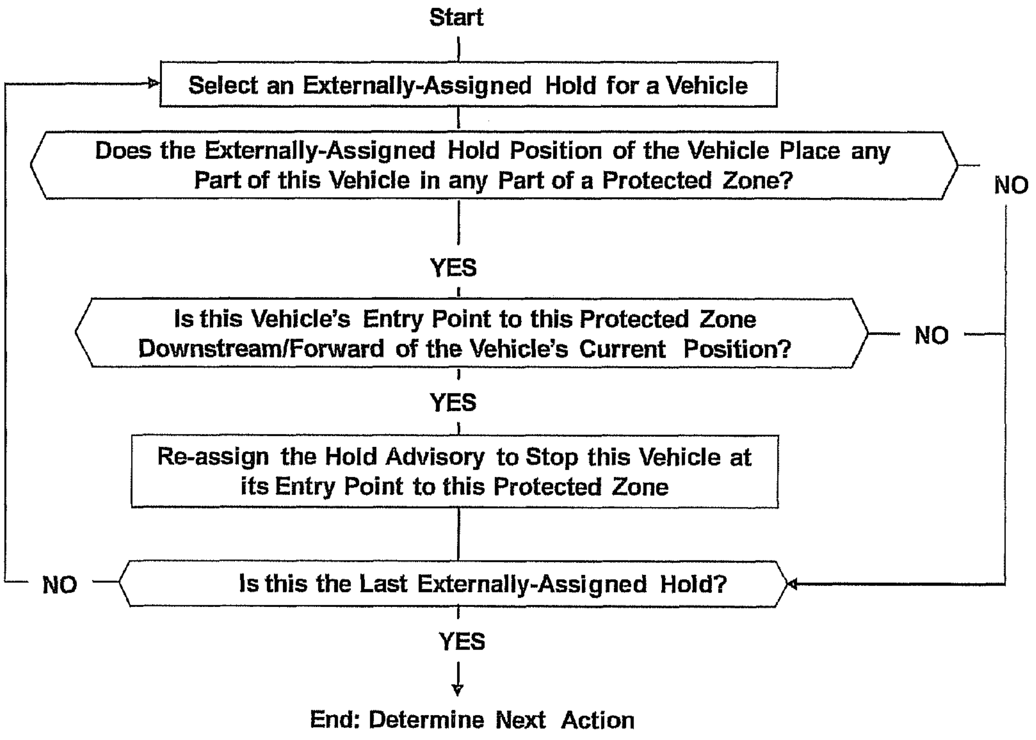
FIG. 30 shows the process for resolving externally induced blockage of a critical section in one embodiment of the present invention.

FIG. 30 shows the process for resolving externally induced blockage of a critical section in one embodiment of the present invention. In this embodiment, the Advisor determines whether the externally-assigned hold position places any portion of the vehicle within the protected zone of an identified critical section. Where the externally-assigned hold position places any portion of the vehicle is within the protected zone of another identified critical section, the Advisor issues a new hold advisory that moves the externally-assigned hold position to an entry point to the other identified critical section to prevent the vehicle blocking the other identified critical section. The Advisor reviews the repositioned hold position to determine whether the repositioned hold point blocks another identified critical section until the repositioned hold point does not induce blockage of any identified critical section.

Alternative Embodiments

The Advisor includes a modular software component that runs on either dedicated or shared computer system resources. In various embodiments, the Advisor is a modular component of the following systems:

- a basic automated surface traffic control system;
- an advanced automated surface traffic control system;
- a real-time computer simulation system; and
- a fast-time computer simulation system.

Each of the above embodiments is discussed in the following sections. In another derived embodiment, which is based on modifications of any one of the above four embodiments, the Advisor is used as a decision support tool to generate hold advisories.

Basic Automated Surface Traffic Control System Embodiment

Figure 20:
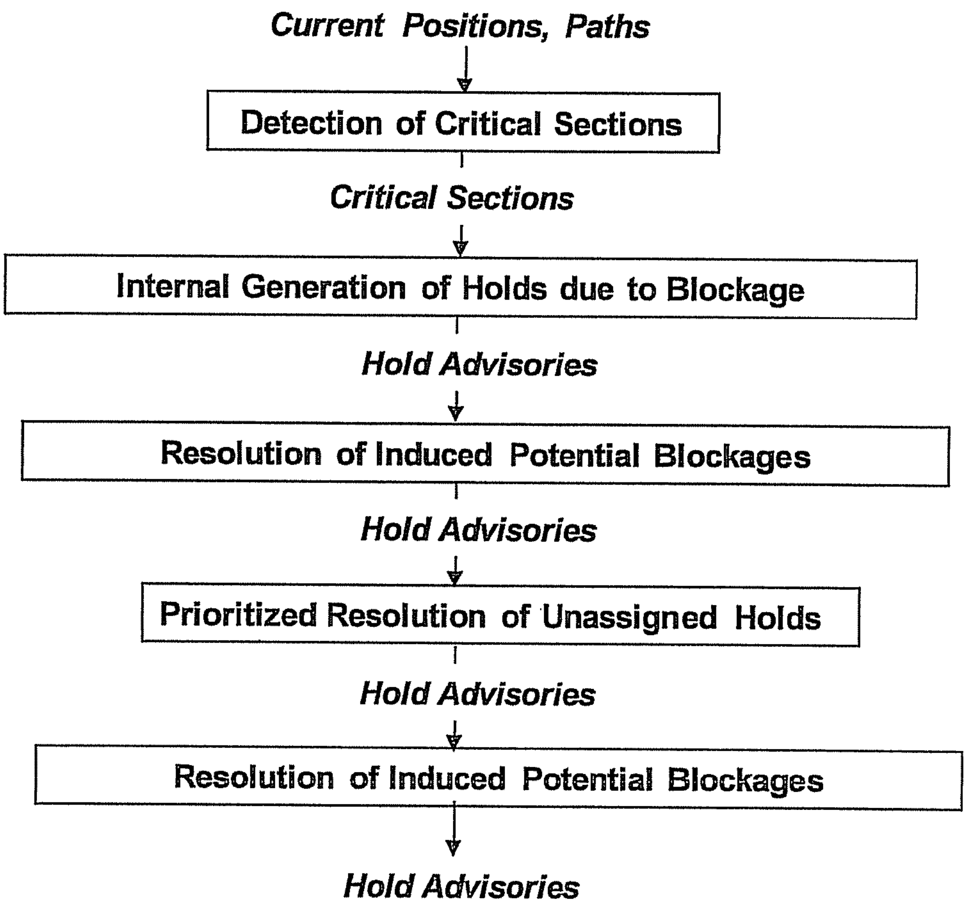
FIG. 20 shows the functional components of the process of one embodiment of the present invention used as a decision support tool within a basic automated surface traffic control system.

In this embodiment, the Advisor is a hardware/software decision support tool within a basic automated surface traffic control system, as shown in FIG. 1. The Advisor generates hold advisories by applying the solution process shown in FIG. 20 at each invocation. In this embodiment, the methodology of the Advisor comprises the following steps:

Detection of Critical Sections

For each pair of vehicles on the airport surface, the Advisor determines if their projected paths share any vertexes on the graph. The search paths start at each vehicle's most recently crossed vertex and proceed along the planned/assigned forward path. The process for detecting crossing, merging and gridlock critical sections includes the following steps.

Figure 21:
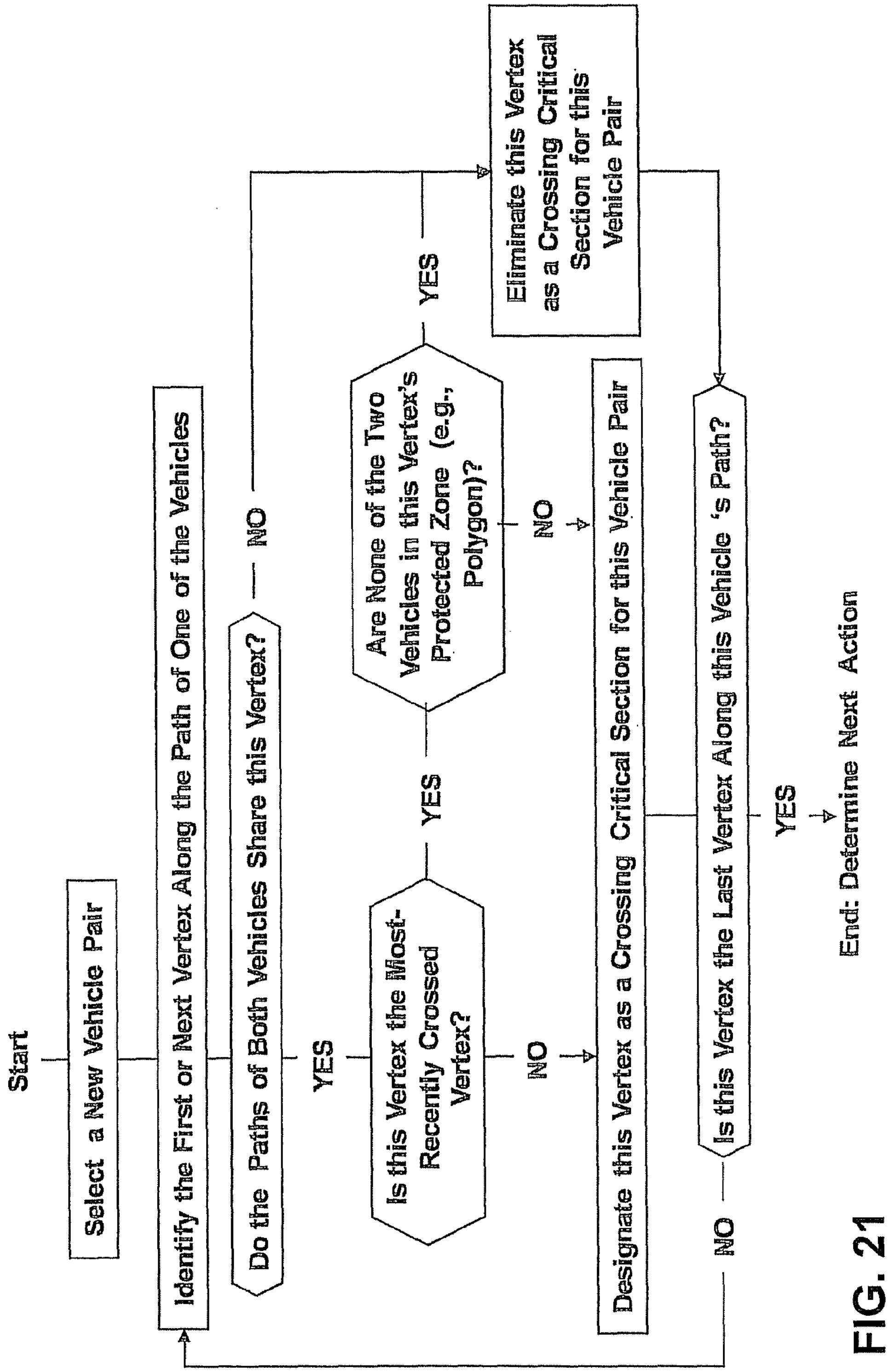
FIG. 21 shows the process for detecting crossing critical sections of one embodiment of the present invention.

Crossing Critical Section Detection—The Advisor selects each vertex along the path of one of the selected vehicles and determines whether the other vehicle shares this vertex, as shown in FIG. 21. If the two aircraft share any surface graph vertex along their paths and the aircraft enter the shared vertex from directions that are different but not opposite to one another, then each shared vertex is a unique crossing critical section for this aircraft pair. However, the Advisor will eliminate the vertex as a potential crossing critical section if the vertex is the most recently crossed vertex of one of the vehicles and neither of the two vehicles occupies any part of the vertex polygon at the current instant. This process is repeated for each vertex along the projected path of the selected vehicle. This process is repeated for each vehicle in the airport surface traffic network using pair-wise comparisons.

Figure 22:
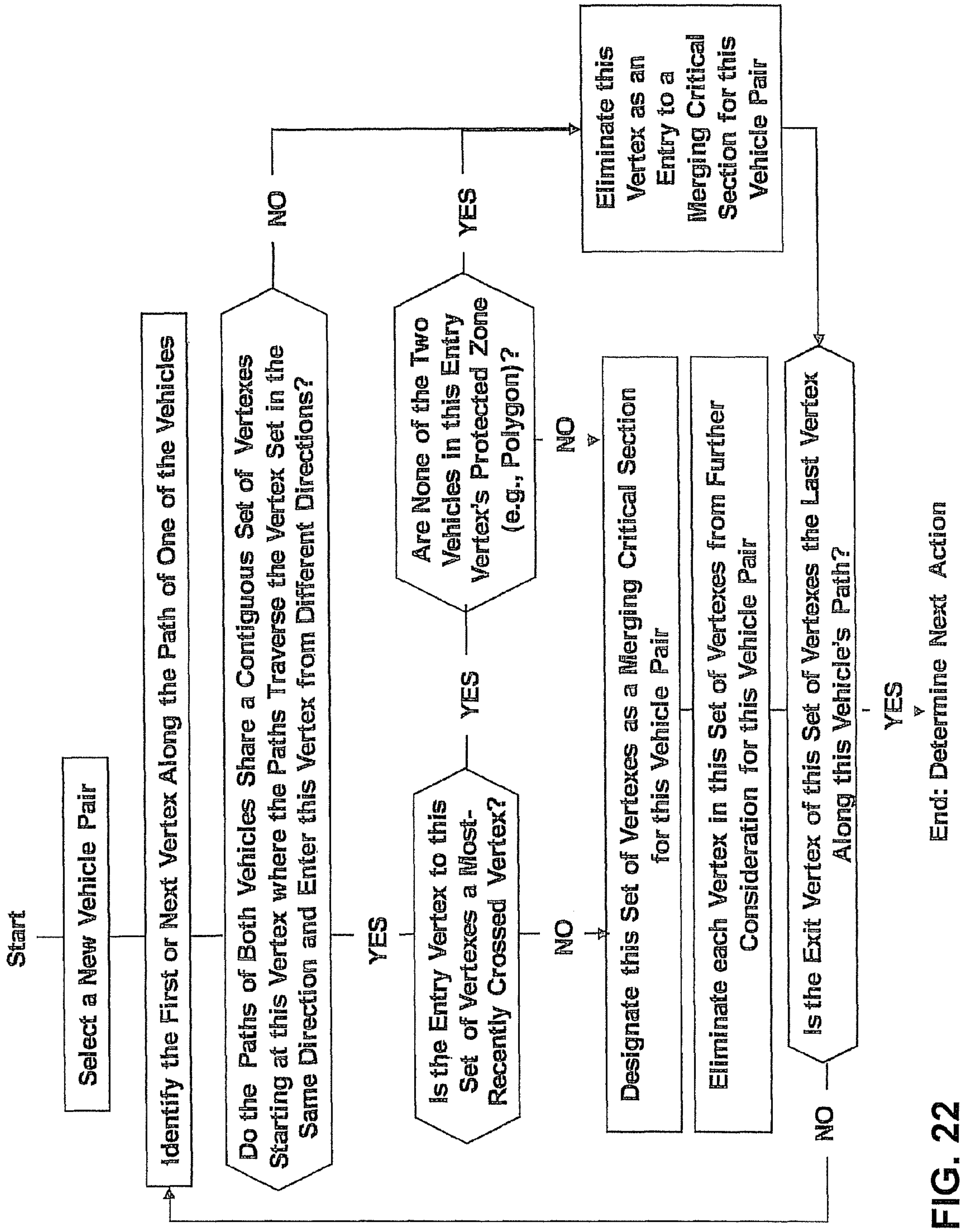
FIG. 22 shows the process for detecting merging critical sections of one embodiment of the present invention.

Merging Critical Section Detection—When the Advisor determines that the projected paths for two vehicles share a contiguous set of multiple vertexes on the graph, the direction of travel of the vehicles through the contiguous set of multiple vertexes is the same, and the aircraft enter the first shared vertex from different directions, then the sequence of shared contiguous vertexes and enclosed edges is a merging critical section for this aircraft pair, as shown in FIG. 22. However, the Advisor will eliminate the sequence of shared contiguous vertexes and enclosed edges as a potential merging critical section if the entry vertex is the most recently crossed vertex by one of the vehicles and neither of the two vehicles occupies any part of the entry vertex at the current instant, as shown in FIG. 22. If the sequence of shared contiguous vertexes and enclosed edges are determined to be a merging critical section for this aircraft pair, the Advisor then removes each of the shred contiguous vertexes from further consideration for this vehicle pair.

Figure 23:
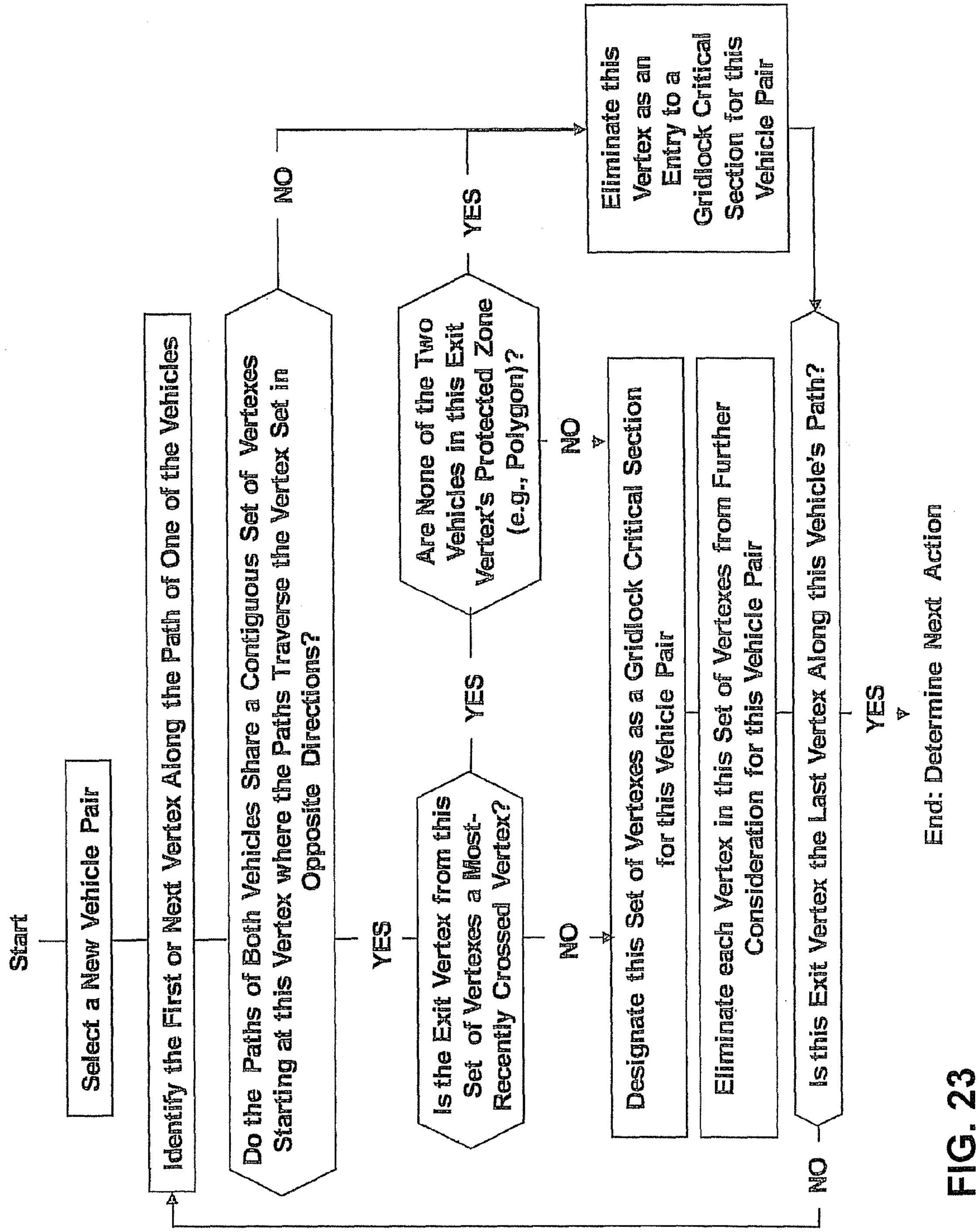
FIG. 23 shows the process for detecting gridlock critical sections of one embodiment of the present invention.

Gridlock Critical Section Detection—When the Advisor determines that the projected paths for two vehicles share a contiguous set of multiple vertexes on the graph, the direction of travel of the vehicles through the contiguous set of multiple vertexes is opposite, then each sequence of shared contiguous vertexes and enclosed edges is a gridlock critical section for this aircraft pair, as shown in FIG. 23. However, the Advisor will eliminate the sequence of shared contiguous vertexes and enclosed edges as a potential gridlock critical section if one of the vehicles aircraft does not occupy any part of the exit vertex at the current instant and the exit vertex for this vehicle is the most recently crossed vertex by that vehicle (i.e., vehicle has exited from protected zone of critical section).

If none of the above critical section detections apply, the Advisor determines that there are no critical sections between these two vehicles.

Internal Generation of Holds Due to Blockage

The process for detecting internal generation of holds due to blockage includes the following steps.

Figure 24:
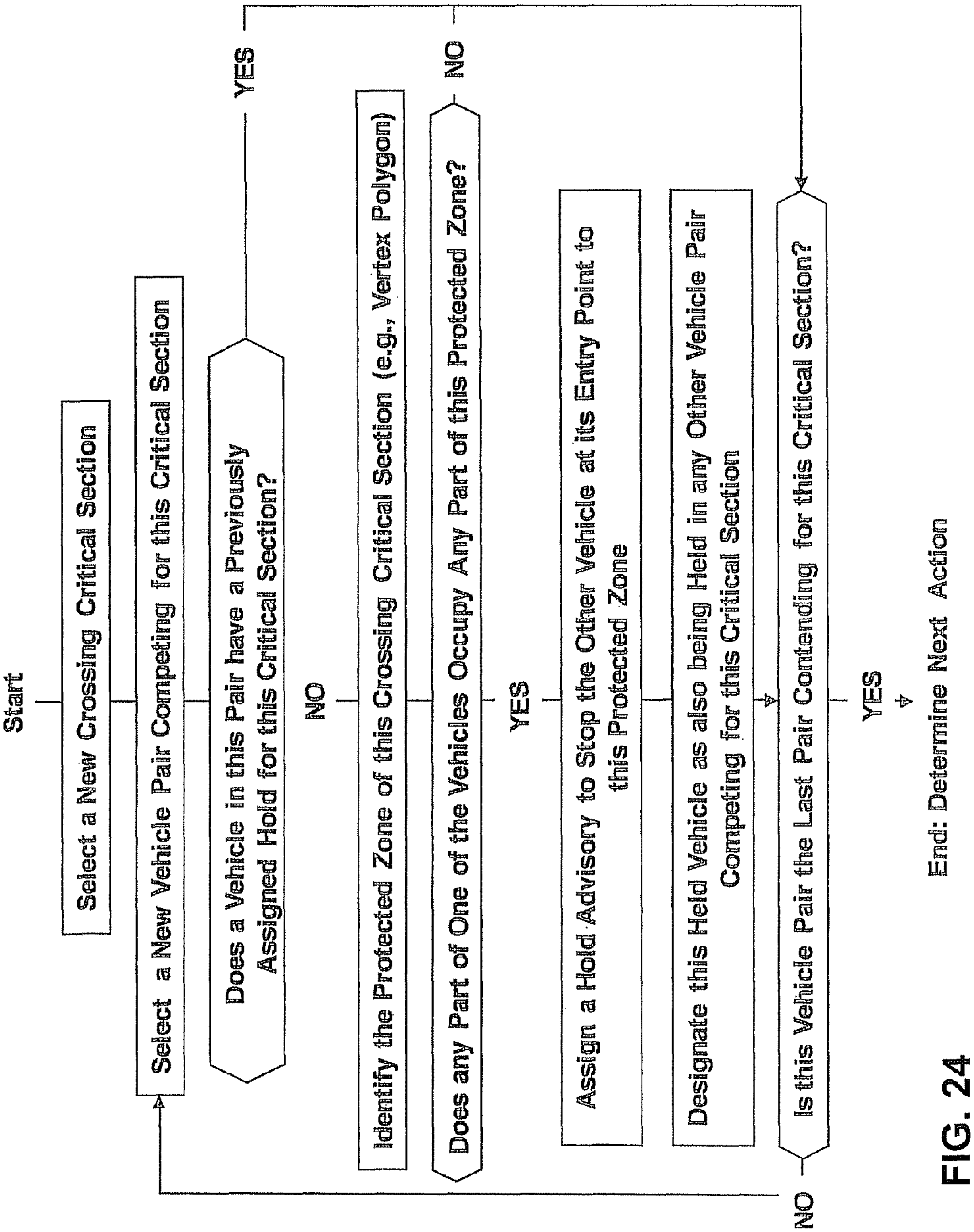
FIG. 24 shows the process for generating holds due to blockage of crossing critical sections of one embodiment of the present invention.

Crossing Critical Section Hold Generation due to Blockage—For each identified crossing critical section for a pair of vehicles where the Advisor has not previously issued a hold advisory assigning a hold position for one of the vehicles as part of a previous pair-wise comparison, The Advisor will issue a hold advisory for the vehicle that is not occupying any part of the protected zone for the identified crossing critical section when any part of the other vehicle occupies any part of the protected zone for the identified crossing critical section (vertex polygon) at the current instant, as shown in FIG. 24. The hold advisory will hold the vehicle at the applicable entry point to the protected zone for this crossing critical section. The Advisor will also designate the aircraft being held in the issued hold advisory to be held in any other aircraft pair that has a conflict for this crossing critical section. Note the held aircraft may be in numerous pairs that are conflicting for one or multiple critical sections. This step eliminates subsequent redundant assessments and prevents potentially contradictory hold assignments.

Figure 25:
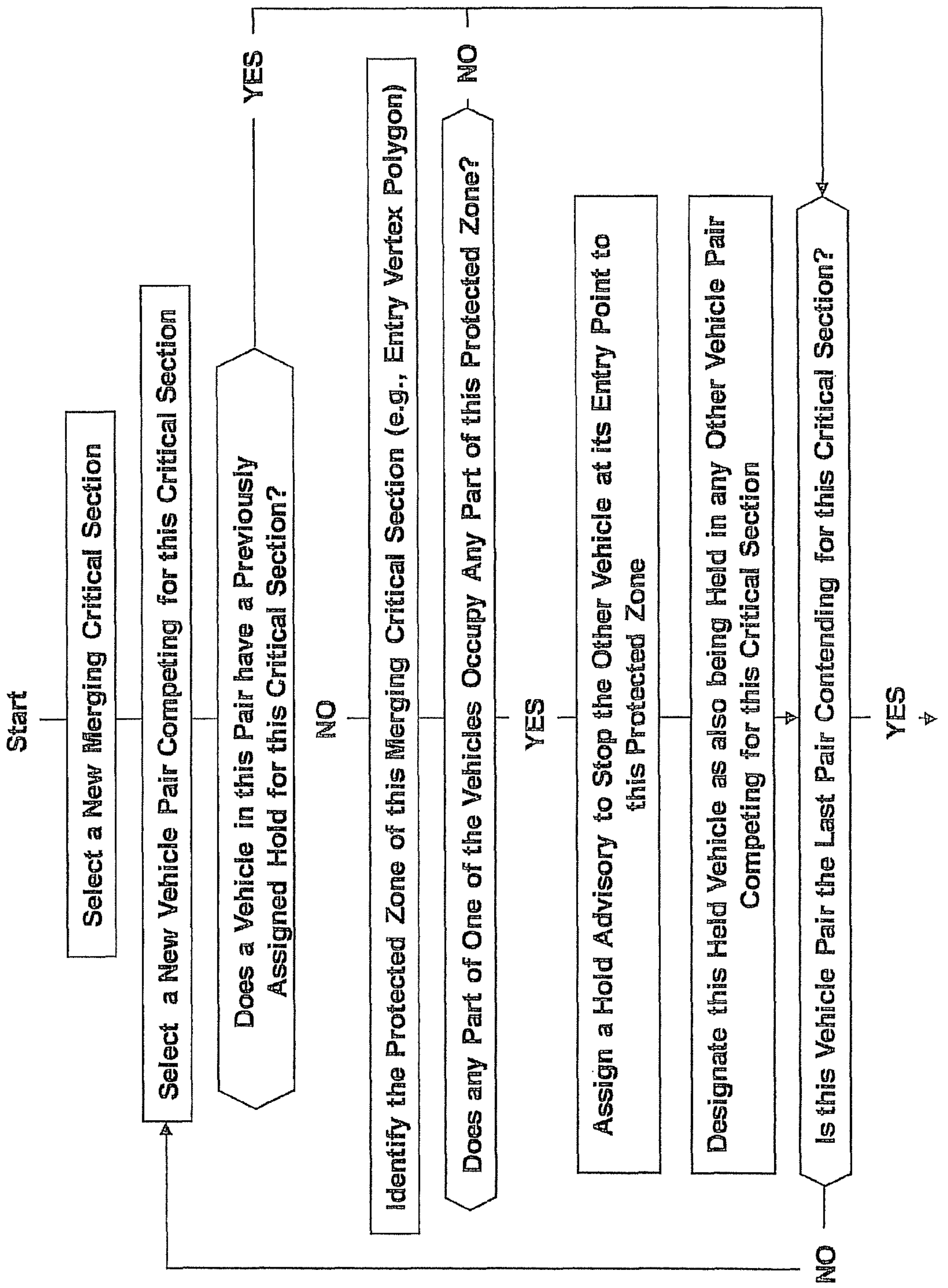
FIG. 25 shows the process for generating holds due to blockage of merging critical sections of one embodiment of the present invention.

Merging Critical Section Hold Generation due to Blockage—For each identified merging critical section for a pair of vehicles where the Advisor has not previously issued a hold advisory assigning a hold position for one of the vehicles as part of a previous pair-wise comparison, The Advisor will issue a hold advisory for the vehicle that is not occupying any part of the protected zone for the identified crossing critical section when any part of the other vehicle occupies any part of the protected zone for the identified crossing critical section (vertex polygon) at the current instant, as shown in FIG. 25. The hold advisory will hold the vehicle at the applicable entry point to the protected zone for this merging critical section. The Advisor will also designate the aircraft being held in the issued hold advisory to be held in any other aircraft pair that has a conflict for this merging critical section. Note the held aircraft may be in numerous pairs that are conflicting for one or multiple critical sections. This step eliminates subsequent redundant assessments and prevents potentially contradictory hold assignments.

Figure 26:
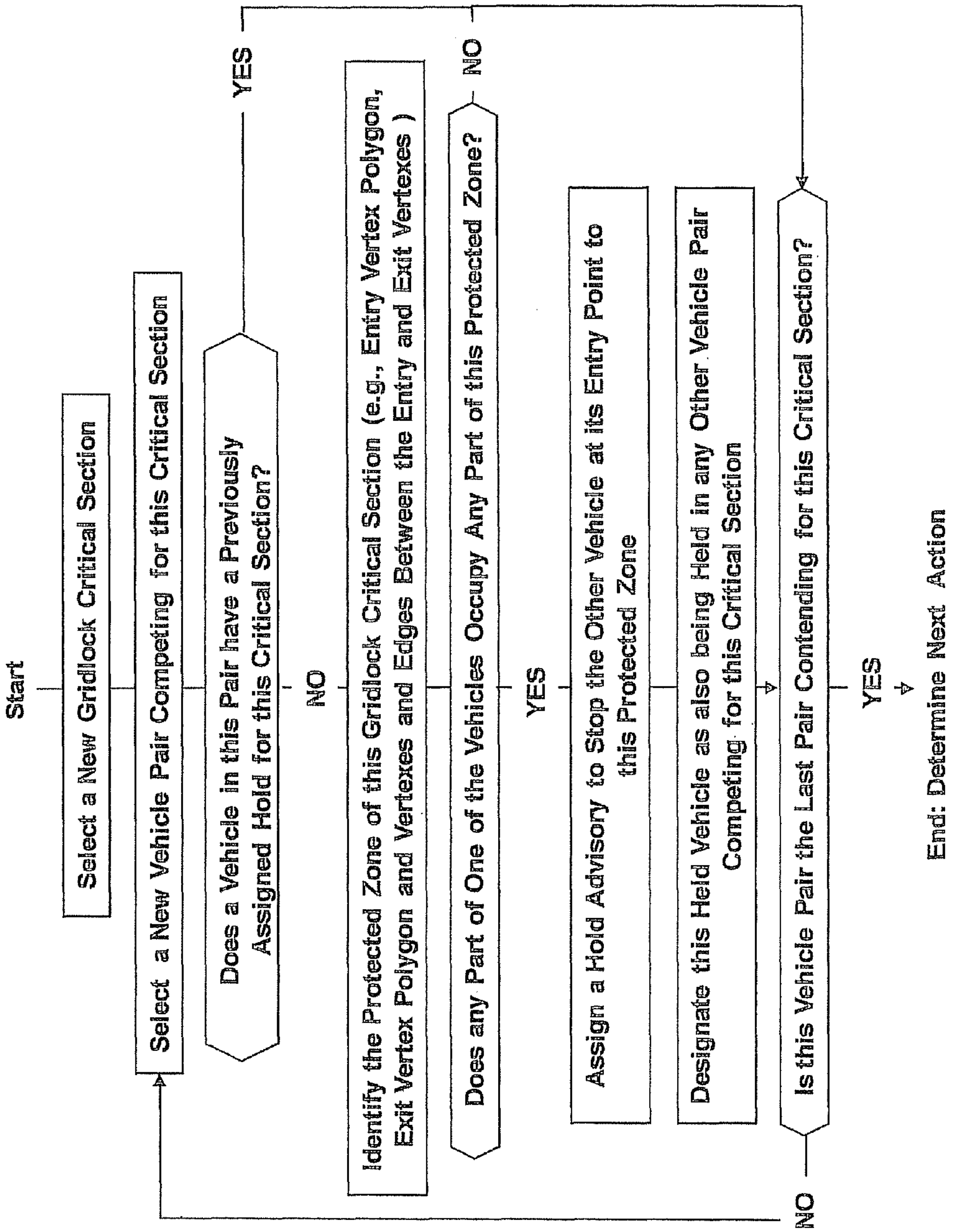
FIG. 26 shows the process for generating holds due to blockage of gridlock critical sections in one embodiment of the present invention.

Gridlock Critical Section Hold Generation due to Blockage—For each identified gridlock critical section and for each pair of opposite-direction aircraft competing for that critical section where the Advisor has not previously issued a hold advisory assigning a hold position for one of the vehicles as part of a previous pair-wise comparison, The Advisor will issue a hold advisory for the vehicle that is not occupying any part of the protected zone for the identified crossing critical section when any part of the other vehicle occupies any part of the protected zone for the identified crossing critical section (vertex polygon) at the current instant, as shown in FIG. 26. The hold advisory will hold the vehicle at the applicable entry point to the protected zone for this merging critical section. The Advisor will also designate the aircraft being held in the issued hold advisory to be held in any other aircraft pair that has a conflict for this gridlock critical section. Note the held aircraft may be in numerous pairs that are conflicting for one or multiple critical sections. This step eliminates subsequent redundant assessments and prevents potentially contradictory hold assignments.

Resolution of Induced Potential Blockages

Figure 27:
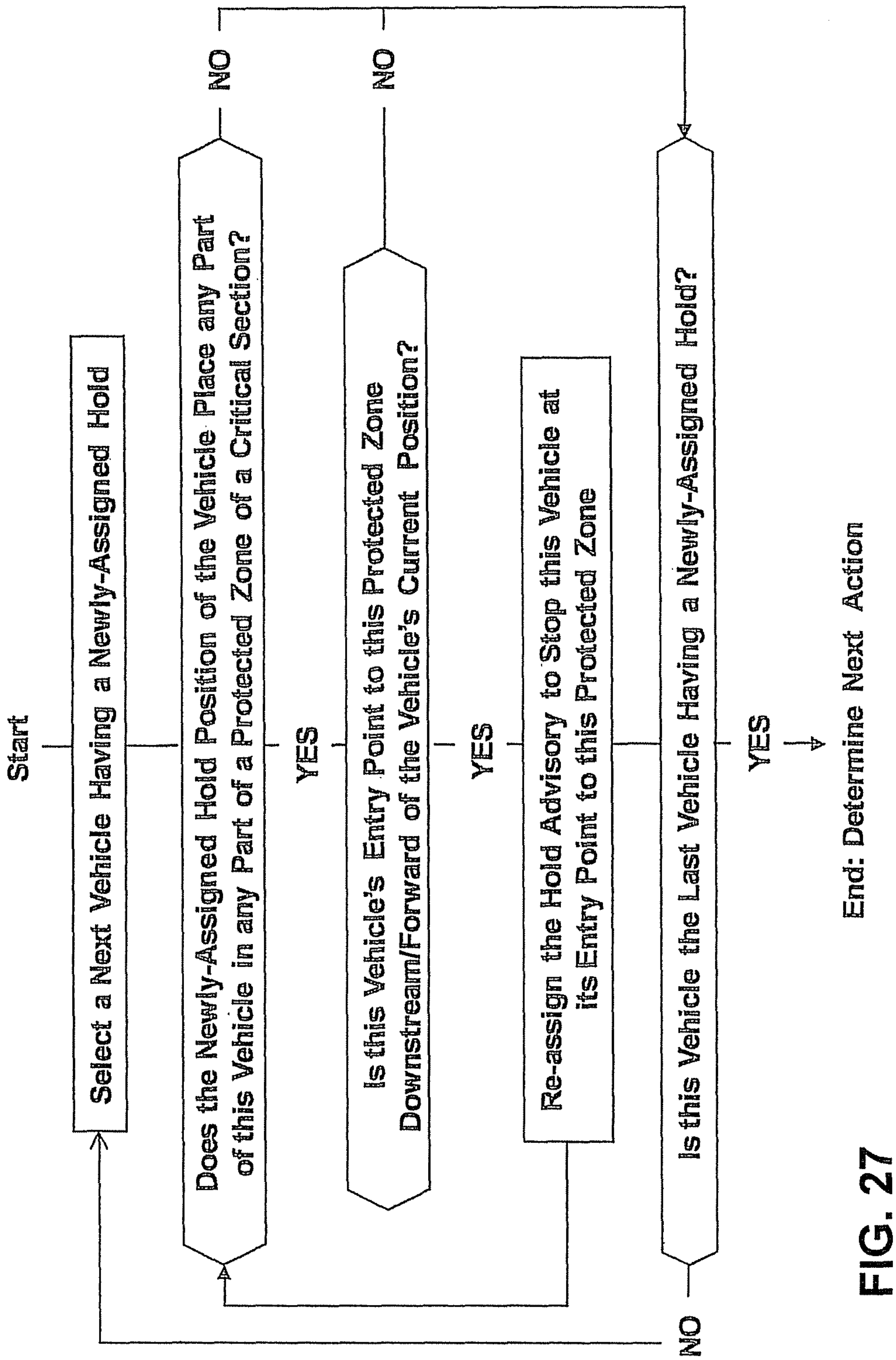
FIG. 27 shows the process for resolving induced blockage of a critical section in one embodiment of the present invention.

The process for resolving induced potential blockages for each vehicle having a newly-assigned hold position in a hold advisory, the Advisor determines whether the hold position places any part of this vehicle in any part of a protected zone (i.e., the hold position causes intrusion of a protected zone), and where the newly-assigned hold position intrudes into another protected zone and is at or forward of this vehicle's current position, The Advisor issues a new hold advisory that reassigns the hold position for this vehicle to the vehicle's entry point into the intruded protected zone, as shown in FIG. 27. The Advisor will also designate the aircraft being held in the issued hold advisory to be held in any other aircraft pair that has a conflict for the intruded critical section. Note the held aircraft may be in numerous pairs that are conflicting for one or multiple critical sections. This step eliminates subsequent redundant assessments and prevents potentially contradictory hold assignments. The Advisor repeats this step in the process until all induced potential blockages are eliminated for this aircraft. Note this step resolves any propagation of a succession of induced blockages originating from a single induced blockage.

Prioritized Resolution of Unassigned Holds

Figure 28:
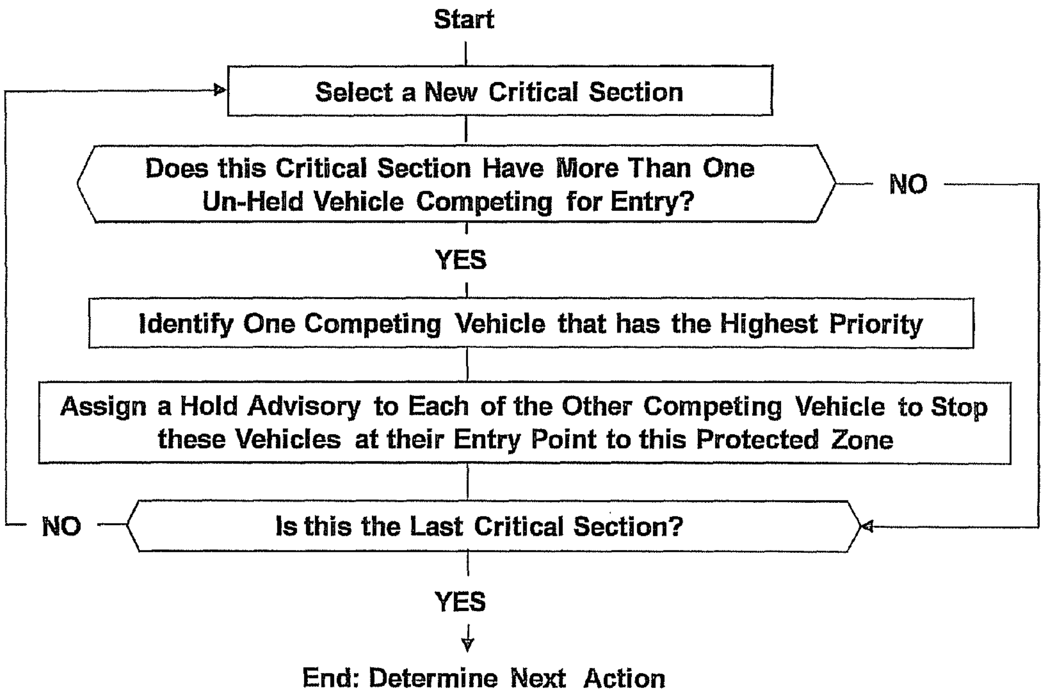
FIG. 28 shows the process for resolving unassigned holds using prioritization in one embodiment of the present invention.

At this point, if neither vehicle in the pair having an identified critical section has been assigned a hold position in a hold advisory in the Advisor processing, then neither vehicle is subject to blockage and neither vehicle has priority over the other. In this situation, both vehicles are potentially eligible to enter the critical section, which would lead to conflict if not resolved. For each identified critical section in which neither vehicle is being held at this point in current assessment session, the Advisor selects the vehicle with the highest priority by applying one or a series of user-defined prioritization criteria (e.g., the closest aircraft to the critical section or the aircraft having the earliest critical section estimated entry time or combinations of selection criteria) and lets this vehicle proceed to or through the critical section without a hold as shown in FIG. 28. For all of the other vehicles having a conflict for the use of the critical section, the Advisor issues a hold advisory to hold the each of the other vehicles at the appropriate entry point to the protected zone for the identified critical section.

Resolution of Induced Potential Blockages

The Advisor repeats the process for resolving induced potential blockages step shown in FIG. 27 for each aircraft having a newly-assigned hold until all induced potential blockages related to the newly-assigned holds are eliminated.

Issue Hold Advisories

Upon determining that all conflicts for critical sections are resolved (i.e., each section has zero or one un-held aircraft), the Advisor issues hold advisories to traffic controllers. For each aircraft with at least one hold advisory, the Advisor issues only the first/earliest hold advisory along the aircraft's path.

Advanced Automated Surface Traffic Control System Embodiment

In this embodiment, the Advisor is a hardware/software decision support tool within an advanced automated surface traffic control system. The Advisor generates hold advisories by applying the solution process shown in FIG. 29 at each invocation. In this embodiment, the methodology of the Advisor comprises the following steps:

Detection of Critical Sections

The Advisor performs the same processing as detailed under the Basic Automated Surface Traffic Control System embodiment, as discussed previously.

Internal Generation of Holds Due to Blockage

The Advisor performs the same processing as detailed under the Basic Automated Surface Traffic Control System embodiment, as discussed previously.

Resolution of Externally Generated Holds

Figure 29:
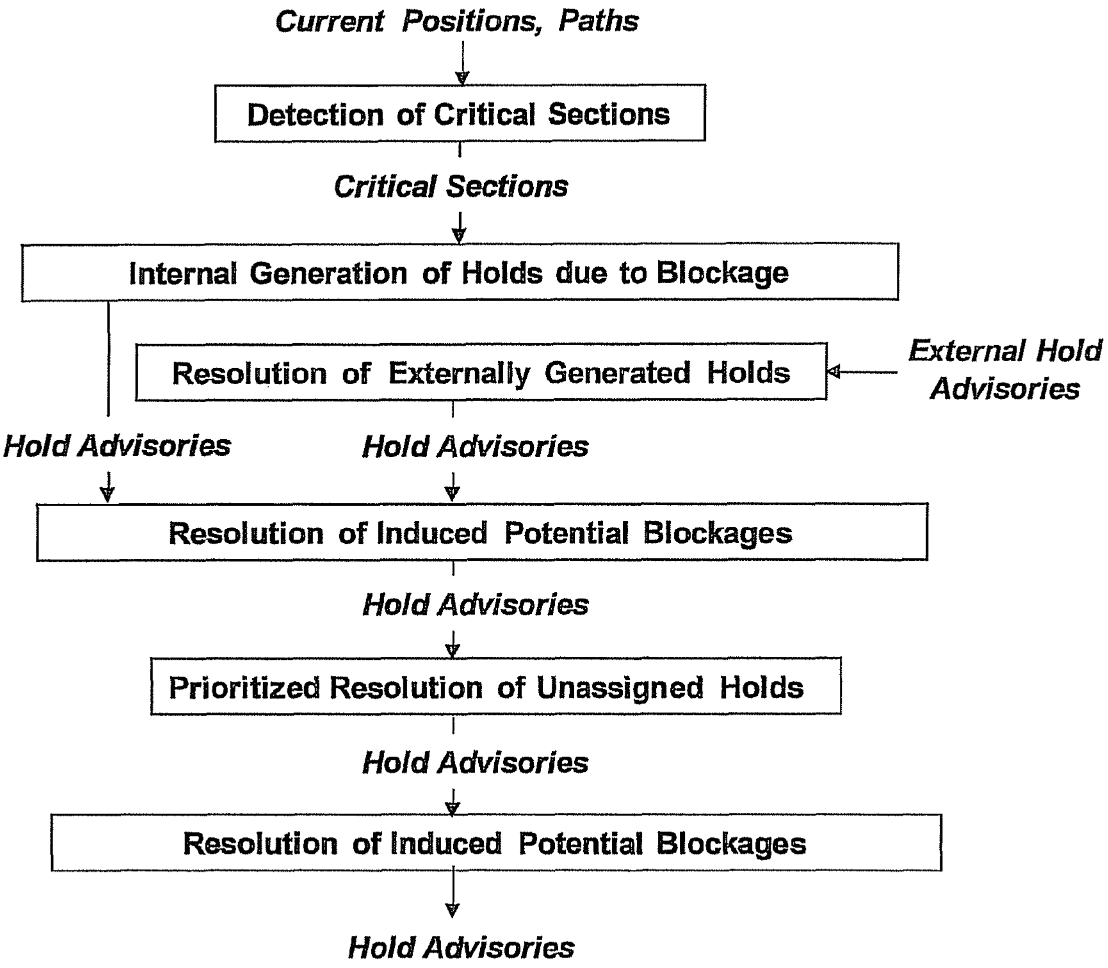
FIG. 29 shows the functional components of the process for one embodiment of the present invention used as one of a decision support tool within an advanced automated surface traffic control system and a software module within a fast-time or real-time computer simulation.

For each externally-assigned hold for a vehicle, the Advisor determines whether any part of one of the vehicles occupies any part of a protected zone for the identified critical section (vertex polygon) at the current instant (i.e., the hold position causes intrusion of a protected zone) and if the vehicle's entry point to this intruded protects zone is at or upstream of this vehicle's current position, the Advisor issues a hold advisory reassigning the hold position for the vehicle to the vehicle's entry point to this intruded protected zone, as shown in FIG. 29.

Resolution of Induced Potential Blockages

The Advisor performs the same processing as detailed under the Basic Automated Surface Traffic Control System embodiment, as discussed previously.

Prioritized Resolution of Unassigned Holds

The Advisor performs the same processing as detailed under the Basic Automated Surface Traffic Control System embodiment, as discussed previously.

Resolution of Induced Potential Blockages

The Advisor performs the same processing as detailed under the Basic Automated Surface Traffic Control System embodiment for all newly assigned hold positions, as discussed previously.

Issue Hold Advisories

The Advisor performs the same processing as detailed under the Basic Automated Surface Traffic Control System embodiment, as discussed previously.

Real-Time Computer Simulation Embodiment

In this embodiment, the Advisor is a module within a real-time simulation system. The simulation system is comprised of hardware/software modules that interface with human traffic controller laboratory test subjects. In this embodiment, the hold advisories generated by the Advisor are provided to the traffic controller test subjects through the interface, as shown in FIG. 4. The Advisor generates hold advisories by applying the same solution process described above for the advanced automated surface traffic control system embodiment.

Fast-Time Computer Simulation Embodiment

In this embodiment, the Advisor is a hardware/software module within a fast-time simulation system. Here the simulation system is comprised of hardware/software modules, including a module that models traffic controller operations, as shown in FIG. 4. Hold advisories generated by the Advisor are provided to the traffic controller module within the structure of the fast-time simulation system. In this embodiment, the Advisor generates hold advisories by applying the same solution process described above for the advanced automated surface traffic control system embodiment.

Reordered Internal Generation of Holds Derived Embodiment

With respect to Internal Generation of Holds due to Blockage in each of the above embodiments, the order in which contending aircraft pairs are examined is flexible. The aircraft pairs may be analyzed in any order to achieve feasible solutions. In this derived embodiment, the applicable steps are performed in any order or intermixed per user preference.

While the present invention has been particularly shown and described with reference to the preferred mode as illustrated in the drawings, it will be understood by one skilled in the art that various changes in detail may be effected therein without departing from the spirit and scope of the invention as defined by the claims.

What is claimed is:

1. A method for preventing conflicts between vehicles in a vehicle traffic network on an airport surface, the method comprising:

defining, via a processor the traffic network on an airport surface, the traffic network comprising at least a plurality of taxiways, runways and intersections therebetween;

determining, via a processor a location and an assigned path for each vehicle in the traffic network for which location and path data are provided;

searching along the assigned path and identifying a conflict where assigned paths for two vehicles merge, cross or intersect from opposing directions on the airport surface;

designating a critical section on the airport surface for each identified conflict and defining a protected zone for each identified critical section;

determining, via a processor a hold requirement for each identified conflict, the hold requirement defining a projected hold position for stopping one of the two vehicles in a conflicting pair at an entry point to the protected zone for the identified critical section;

determining, via a processor whether any of the projected hold positions for the vehicles intrudes into the protected zone;

repositioning projected hold positions intruding into the protected zone; and providing a hold advisory to a traffic controller, said hold advisory comprising the hold requirement to stop all but one vehicle or all vehicles at entry points to the protected zone for each identified critical section on the airport surface, wherein identifying said conflict comprises: pairing one vehicle with each of the other vehicles in the traffic network, comparing, via a processor, the assigned path for the one vehicle to the assigned path for the other vehicle in the pair to identify common vertexes; identifying each common vertex as a part of a critical section on the airport surface; repeating the pairing and comparing, via a processor, of the assigned path for the one vehicle to the assigned paths for each of the remaining other vehicles in the traffic network; and repeating the pairing and comparing of the assigned paths for each of the remaining other vehicles in pairs in the traffic network.

2. The method of claim 1, wherein searching along the assigned path commences at a vertex most recently crossed by each vehicle in the pair and moves forward along a remaining portion of the assigned path for each vehicle, wherein the remaining portion includes a current position of the vehicle.

3. The method of claim 2, wherein the vertex most recently crossed, the current position and remaining portion of the assigned path for each vehicle are provided as input data.

4. The method of claim 1, wherein the critical section is a crossing critical section when the assigned paths for each of the vehicles in the pair intersect a single vertex.

5. The method of claim 4, wherein the protected zone of the crossing critical section comprises an area containing at least the identified single common vertex.

6. The method of claim 1, wherein the critical section is a merging critical section when the assigned paths for each of the vehicles in the pair have more than one common vertex and are moving in the same direction.

7. The method of claim 6, wherein the protected zone of the merging critical section comprises an area containing at least a first common vertex identified along the assigned paths for each of the vehicles.

8. The method of claim 1, wherein the critical section is a gridlock critical section where the assigned paths for each of the vehicles in the pair have more than one common vertex and are moving in different directions.

9. The method of claim 8, wherein the protected zone of the gridlock critical section comprises an area containing a first common vertex along the assigned path and direction of travel for the one vehicle, an area containing a first common vertex along the assigned path and direction of travel for the another vehicle and an area containing the more than one common vertexes identified and the edges between each of the more than one common vertexes.

10. The method of claim 1, wherein the protected zone is blocked when any part of a vehicle occupies any part of the protected zone.

11. The method of claim 1, further comprising repositioning the projected hold position when a projected hold position causes the held vehicle to block at least a portion of a protected zone, wherein the repositioned projected hold position is an entry point for the vehicle to the protected zone.

12. The method of claim 1, wherein repositioning the projected hold position comprises repositioning a hold position generated by an external function.

13. The method of claim 1, further comprising applying user-defined prioritization rules to assign projected hold positions to vehicles when more than one vehicle is not assigned a projected hold position.

14. The method of claim 1, wherein repositioning the projected hold position further comprises determining whether the repositioned hold position causes the held vehicle to block at least a portion of a protected zone and repositioning the repositioned hold position when the repositioned hold position causes the held vehicle to block at least a portion of a protected zone.

15. The method of claim 1, wherein said hold advisories stop vehicles at an earliest hold position along the vehicle's path from the current position of the vehicle.

16. The method of claim 1, wherein said hold position selected for each of the vehicles are provided to traffic controllers in surface air traffic control systems.

17. The method of claim 1, wherein the airport surface traffic network is a graph, each of the plurality of intersections is a vertex on the graph and each of the runways and taxiways is an edge on the graph.

18. The method of claim 1, wherein the hold requirement permits no more than one vehicle to move uninterrupted through the identified critical section.

19. A system for preventing conflicts between vehicles in a vehicle traffic network on an airport surface comprising:

one or more surveillance systems covering a traffic network on an airport surface, the traffic network comprising at least a plurality of taxiways, runways and intersections therebetween; and a computer running a program for preventing conflicts, wherein the computer receives at least location data and path data from the one or more surveillance systems;

determines a location and an assigned path for each vehicle in the traffic network for which location and path data are provided;

searches along the assigned path and identifies a conflict where assigned paths for two vehicles merge, cross or intersect from opposing directions on the airport surface;

designates a critical section on the airport surface for each identified conflict and defines a protected zone for each identified critical section;

determines a hold requirement for each identified conflict, the hold requirement defines a projected hold position for stopping one of the two vehicles in a conflicting pair at an entry point to the protected zone for the identified critical section;

determines whether any of the projected hold positions for the vehicles intrudes into the protected zone;

repositions projected hold positions that intrude into the protected zone; and provides a hold advisory to a traffic controller, said hold advisory comprising the hold requirement to stop all but one vehicle or all vehicles at entry points to the protected zone for each identified critical section on the airport surface, wherein the computer identifies a conflict by: pairing one vehicle with each of the other vehicles in the traffic network; comparing the assigned path for the one vehicle to the assigned path for the other vehicle in the pair to identify common vertexes; identifying each common vertex as a part of a critical section on the airport surface; repeating the pairing and comparing of the assigned path for the one vehicle to the assigned paths for each of the remaining other vehicles in the traffic network; and repeating the pairing and comparing of the assigned paths for each of the remaining other vehicles in pairs in the traffic network.

20. The system of claim 19, wherein the computer searches along the assigned path starting at a vertex most recently crossed by each vehicle in the pair and moves forward along a remaining portion of the assigned path for each vehicle, the remaining portion of the assigned path including a current position of the vehicle.

21. The system of claim 20, wherein the vertex most recently crossed, the current position and remaining portion of the assigned path for each vehicle are provided as input data to the computer by at least the one or more surveillance systems.

22. The system of claim 19, wherein the computer identifies the critical section as a crossing critical section when the assigned paths for each of the vehicles in the pair intersect a single vertex.

23. The system of claim 22, wherein the computer determines the protected zone of the crossing critical section comprises an area containing at least the identified single common vertex.

24. The system of claim 19, wherein the computer identifies the critical section as a merging critical section when the assigned paths for each of the vehicles in the pair have more than one common vertex and are moving in the same direction.

25. The system of claim 23, wherein the computer determines the protected zone of the merging critical section comprises an area containing at least a first common vertex identified along the assigned paths for each of the vehicles.

26. The system of claim 19, wherein the computer identifies the critical section as a gridlock critical section where the assigned paths for each of the vehicles in the pair have more than one common vertex and are moving in different directions.

27. The system of claim 26, wherein the computer determines the protected zone of the gridlock critical section comprises an area containing a first common vertex along the assigned path and direction of travel for the one vehicle, an area containing a first common vertex along the assigned path and direction of travel for the another vehicle and an area containing the more than one common vertexes identified and the edges between each of the more than one common vertexes.

28. The system of claim 19, wherein the computer determines that the protected zone is blocked when any part of a vehicle occupies any part of the protected zone.

29. The system of claim 19, further comprising the computer repositions the projected hold position when a projected hold position causes the held vehicle to block at least a portion of a protected zone, wherein the repositioned projected hold position is an entry point for the vehicle to the protected zone.

30. The system of claim 19, wherein the computer repositioning the projected hold position comprises repositioning a hold position generated by an external function.

31. The system of claim 19, further comprising the computer applies user-defined prioritization rules to assign projected hold positions to vehicles when more than one vehicle is not assigned a projected hold position.

32. The system of claim 19, wherein the computer determines whether the repositioned hold position causes the held vehicle to block at least a portion of a protected zone and repositions the repositioned hold position when the repositioned hold position causes the held vehicle to block at least a portion of a protected zone.

33. The system of claim 19, wherein said hold advisories stop the one or more vehicles at an earliest hold position along the vehicle's path from the current position of the vehicle.

34. The system of claim 19, wherein the computer determines a hold position and displays the hold position selected for each of the one or more vehicles to traffic controllers in a surface traffic control system.

35. The system of claim 19, wherein the computer defines the airport surface traffic network on a graph with each of the plurality of intersections as a vertex on the graph and each of the runways and taxiways as an edge on the graph.

36. The system of claim 19, wherein the hold requirement permits no more than one vehicle to move uninterrupted through the identified critical section.

* * * * *